United States Patent
Yamane et al.

(10) Patent No.: US 11,507,724 B2
(45) Date of Patent: Nov. 22, 2022

(54) NON-TRANSITORY COMPUTER-READABLE STORAGE MEDIUM STORING ESTIMATION PROGRAM, ESTIMATION DEVICE, AND ESTIMATION METHOD

(71) Applicant: FUJITSU LIMITED, Kawasaki (JP)

(72) Inventors: Shohei Yamane, Kawasaki (JP); Yusuke Oishi, Yokohama (JP); Hiroaki Watanabe, Chiba (JP); Yoichi Kochibe, Chiba (JP)

(73) Assignee: FUJITSU LIMITED, Kawasaki (JP)

( * ) Notice: Subject to any disclaimer, the term of this patent is extended or adjusted under 35 U.S.C. 154(b) by 499 days.

(21) Appl. No.: 16/583,913

(22) Filed: Sep. 26, 2019

(65) Prior Publication Data

US 2020/0110850 A1 Apr. 9, 2020

(30) Foreign Application Priority Data

Oct. 5, 2018 (JP) .............................. JP2018-190508

(51) Int. Cl.
*G06N 20/00* (2019.01)
*G06F 30/367* (2020.01)
*G06F 119/08* (2020.01)

(52) U.S. Cl.
CPC ........... *G06F 30/367* (2020.01); *G06N 20/00* (2019.01); *G06F 2119/08* (2020.01)

(58) Field of Classification Search
CPC .... G06F 30/367; G06F 2119/08; G06F 30/27; G06N 20/00; G06N 3/0454; G06N 3/08; G01R 31/002; G01R 31/2817; G01R 31/31725; G01R 29/0814; H01L 27/14649; H01R 3/00; H03K 5/1252; H04N 13/04

See application file for complete search history.

(56) References Cited

U.S. PATENT DOCUMENTS 6,489,614 B1 * 12/2002 Deguchi ........... H01L 27/14649
250/332
2010/0277157 A1 * 11/2010 Tani ..................... G01R 31/002
324/72

FOREIGN PATENT DOCUMENTS

| CN | 1454318 A | * | 11/2003 | ........... G01R 31/002 |
| CN | 201355386 Y | * | 12/2009 | |
| CN | 104703454 A | * | 6/2015 | ........... H03K 5/1252 |
| CN | 106164684 A | * | 11/2016 | ......... G01R 31/2817 |
| CN | 10479282 B | * | 10/2017 | |

OTHER PUBLICATIONS

U.S. Pat. No. 6,489,614, see short version.*
(Continued)

*Primary Examiner* — Kandasamy Thangavelu
(74) *Attorney, Agent, or Firm* — Staas & Halsey LLP

(57) ABSTRACT

An estimation method is performed by a computer for estimating a far field of electromagnetic waves or heat. The method includes: generating an emphasis pattern image obtained by emphasizing each target element of a pattern image of a target circuit by an emphasizing method that corresponds to a type of each target element, with respect to the target element which is at least a part of elements included in the target circuit; and estimating the far field of electromagnetic waves or heat radiated from the target circuit by an existing estimation model using the emphasis pattern image.

12 Claims, 17 Drawing Sheets

(56) References Cited

OTHER PUBLICATIONS

Tani et al., "Apparatus and method for determining the type of Electromagnetic wave generating apparatus", U.S. 2010/0277157, Nov. 2010, see short version.*

Xiaoxiao Guo, et al., "Convolutional Neural Networks for Steady Flow Approximation", ACM SIGKDD Conference on Knowledge Discovery and Data Mining, Aug. 13-17, 2016.

* cited by examiner

NON-TRANSITORY COMPUTER-READABLE STORAGE MEDIUM STORING ESTIMATION PROGRAM, ESTIMATION DEVICE, AND ESTIMATION METHOD

CROSS-REFERENCE TO RELATED APPLICATION

This application is based upon and claims the benefit of priority of the prior Japanese Patent Application No. 2018-190508, filed on Oct. 5, 2018, the entire contents of which are incorporated herein by reference.

FIELD

The embodiments discussed herein are related to a non-transitory computer-readable storage medium storing an estimation program and the like.

BACKGROUND

In recent years, estimation of a far field of electromagnetic waves radiated from a circuit using a machine learning technology, such as deep learning (DL), has been performed. For example, an estimation method by the DL estimates the far field of the electromagnetic waves based on a practical circuit using a learning circuit and a learning model generated from learning data that is paired with a simulation result of electromagnetic wave analysis for the circuit. In addition, the term "circuit" used here means a circuit over an image obtained by simulating an actual circuit by a computer and developing the simulated actual circuit into an image.

In addition, a signed distance function (SDF) technology for assigning a value that corresponds to a distance from a boundary of an object, with respect to the object over an image, is known. In the SDF, for example, a value of 0 is assigned to a boundary part of the object, a negative value is assigned within the boundary, and a positive value is assigned to the outside of the boundary, and an absolute value linearly increases as the distance increases. A technology for estimating a flow velocity field in aerodynamics by the DL using the SDF is disclosed (refer to Xiaoxiao Guo et al. "Convolutional Neural Networks for Steady Flow Approximation". ACM SIGKDD Conference on Knowledge Discovery and Data Mining). It is also possible to apply the technology to the circuit over the image using the SDF regarding a wiring included in the circuit as an object.

However, there is a problem that estimation is not possible with excellent accuracy in a case of estimating the far field of the electromagnetic waves radiated from the circuit using the DL.

For example, even when the circuit is the same as the circuit that causes the same result as the radiation of the electromagnetic waves, when the circuit positions are different, there is a case where the estimation results of the far field of the electromagnetic waves estimated by the DL are different. FIG. 19 is a reference example of a case where the estimation result is different depending on the circuit positions. As illustrated in FIG. 19, the circuit in the upper left figure and the circuit in the upper right figure are the same circuit, but the circuit positions are different. The lower left figure illustrates the far field of the electromagnetic waves of the estimation result and the simulation result of the circuit in the upper left figure. The lower right figure illustrates the far field of the electromagnetic waves of the estimation result and the simulation result of the circuit in the upper right figure. As a result, even when the simulation result is the same circuit as indicated by the broken line, when the circuit positions are different, the estimation result is different as indicated by the solid line. Therefore, it is not possible to estimate the far field of the electromagnetic waves based on the circuit over the image with excellent accuracy.

In addition, even when the SDF technology is applied to the circuit over the image, regarding the radiation of the electromagnetic waves, even in a case where the circuit is completely different and in a case where the images are similar to each other, it is difficult to perform learning by distinguish different circuits by the DL. FIG. 20 is a reference example of a case where different circuits become similar images. As illustrated in FIG. 20, the circuit in the upper left figure and the circuit in the upper right figure are different circuits. The lower left figure is an image to which the SDF is applied to the circuit in the upper left figure. The lower right figure is an image to which the SCF is applied to the circuit in the upper right figure. As a result, even in a case where the circuits are completely different, the images are similar to each other. Therefore, it is not possible to estimate the far field of the electromagnetic waves based on the circuit over the image with excellent accuracy.

In addition, the above-described problem is a problem which arises not only in a case of estimating the far field of the electromagnetic waves based on the circuit over the image but also in a case of estimating a far field of heat based on the circuit over the image.

According to an aspect, an object of the disclosure is to perform estimation with excellent accuracy in a case of estimating the far field of the electromagnetic waves radiated from the circuit using machine learning.

SUMMARY

According to an aspect of the embodiments, an estimation method is performed by a computer for estimating a far field of electromagnetic waves or heat. The method includes: generating an emphasis pattern image obtained by emphasizing each target element of a pattern image of a target circuit by an emphasizing method that corresponds to a type of each target element, with respect to the target element which is at least a part of elements included in the target circuit; and estimating the far field of electromagnetic waves or heat radiated from the target circuit by an existing estimation model using the emphasis pattern image.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Hereinafter, examples of a non-transitory computer-readable storage medium storing an estimation program, an estimation device, and an estimation method according to the disclosure will be described in detail with reference to the drawings. In addition, the disclosure is not limited to the examples.

Example 1

Configuration of Estimation Device According to Example 1

Figure 1:
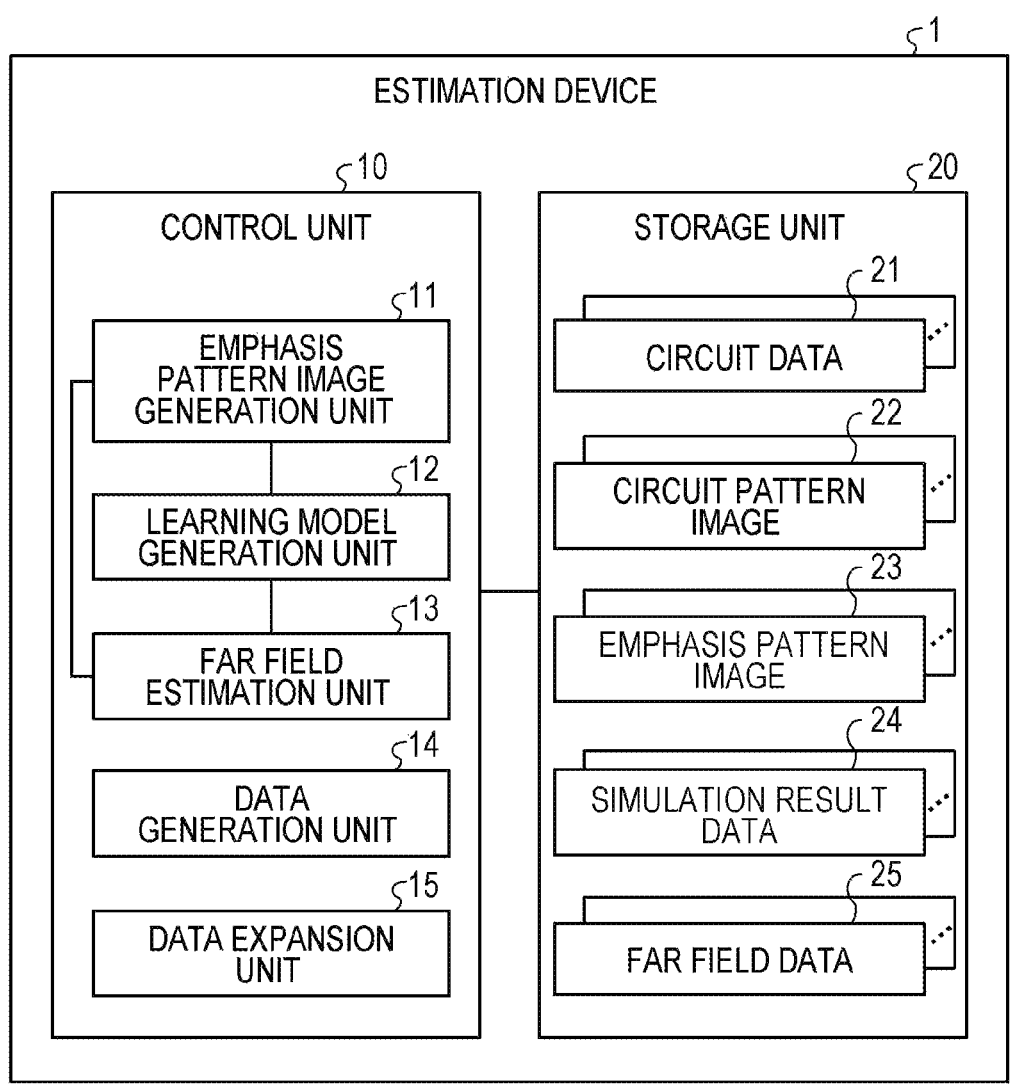
FIG. 1 is a functional block diagram illustrating a configuration of an estimation device according to Example 1.

FIG. 1 is a functional block diagram illustrating a configuration of the estimation device according to Example 1. In a case of estimating a far field of electromagnetic waves radiated from a circuit, an estimation device 1 illustrated in FIG. 1 generates an emphasis pattern image obtained by emphasizing a pattern image of the circuit by a method that corresponds to a type of an element included in the circuit and estimates the far field of the electromagnetic waves of a target circuit using the generated emphasis pattern image. Here, the far field refers to the distant (predetermined distance) region of the electromagnetic waves radiated from the target circuit, and includes the state of the electromagnetic waves. The predetermined distance is, for example, 10 meters (m). In addition, the predetermined distance is not limited to 10 m, and for example, the distance by which a control value of the electromagnetic waves radiation is provided may be employed.

Figure 2:
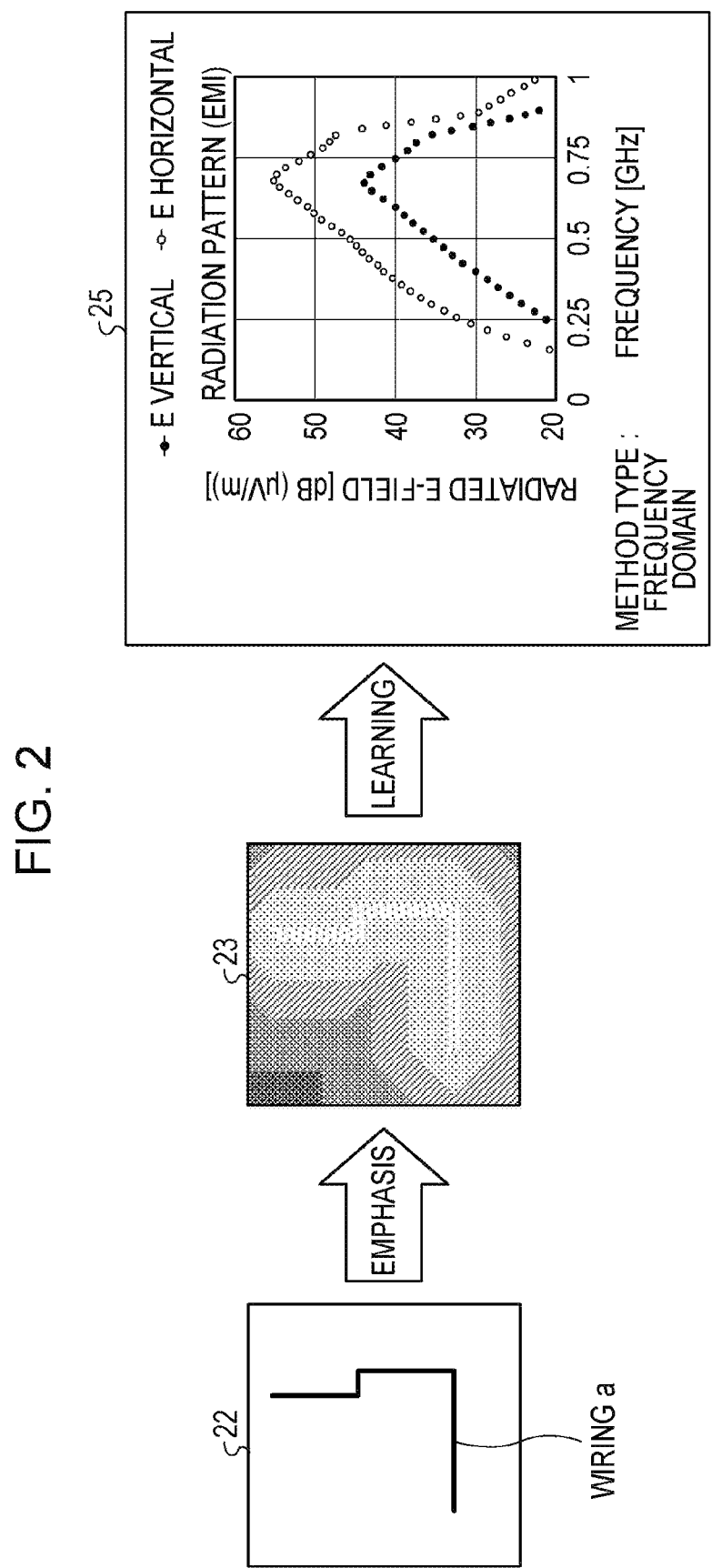
FIG. 2 is a view for describing a focus point of far field estimation according to Example 1.

Here, a focus point of far field estimation according to Example 1 will be described with reference to FIG. 2. FIG. 2 is a view for describing the focus point of the far field estimation according to Example 1. The left figure of FIG. 2 illustrates a pattern image of the circuit (referred to as "circuit pattern image"). In a circuit pattern image 22, a wiring a which is one of the elements included in the circuit is illustrated.

The middle figure of FIG. 2 illustrates an emphasis pattern image 23 obtained by emphasizing the circuit pattern image 22. The emphasis pattern image 23 is an image obtained by processing an element included in the circuit indicated by the circuit pattern image 22 and having a large influence on the radiation of the electromagnetic waves. In other words, the emphasis pattern image 23 is an image approximated to a near field of the electromagnetic waves indicating an intermediate result of simulation in a case where the circuit pattern image 22 is input into the simulation of the electromagnetic wave analysis. In other words, the estimation device 1 generates the emphasis pattern image 23 obtained by emphasizing the circuit pattern image 22 based on an emphasizing method for each element included in the circuit and having a large influence on the radiation of the electromagnetic waves. Here, the element having a large influence on the radiation of the electromagnetic waves is the wiring a. In addition, the estimation device 1 generates the influence of the electromagnetic waves in the near field radiated from the wiring a as the emphasis pattern image 23. The element having a large influence on the radiation of the electromagnetic waves is not limited to the wiring, and may be a circuit device (also simply referred to as a device) including an active device (for example, a transistor) or a passive device (for example, a resistor) and a by-pass capacitor. Generally, the capacitor is also a passive device, but in the following, the by-pass capacitor and the other devices will be described separately. In addition, although will be described in detail with reference to FIG. 3, the circuit pattern image 22 and the emphasis pattern image 23 are reversed in black and white in the drawing.

Thereafter, the estimation device 1 inputs the emphasis pattern image 23 into a learning model, and estimates the far field of the electromagnetic waves by the learning model. Such a learning model is a learning model generated from teacher data in which the emphasis pattern image 23 of a circuit for the teacher data is paired with the data of the far field ("far field data") of the electromagnetic waves indicating a simulation result of the circuit. The right figure of FIG. 2 illustrates far field data 25 estimated by the learning model. The far field data 25 includes the intensity of the electromagnetic waves for each frequency.

Accordingly, in the estimation device 1, it is possible to estimate the far field of the electromagnetic waves with excellent accuracy with respect to the target circuit by using the learning model in which the influence (near field) of the electromagnetic waves is taken into consideration. In addition, in the estimation device 1, it is possible to estimate the far field of the electromagnetic waves at high speed by using the emphasis pattern image 23 obtained by emphasizing the target circuit for the input into the learning model without performing simulation with respect to the target circuit.

Returning to FIG. 1, the estimation device 1 includes a control unit 10 and a storage unit 20.

The control unit 10 is an electronic circuit, such as a central processing unit (CPU). In addition, the control unit 10 has an internal memory for storing programs defining various processing procedures or control data, and executes various processing using the programs and data. The control unit 10 includes an emphasis pattern image generation unit 11, a learning model generation unit 12, a far field estimation unit 13, a data generation unit 14, and a data expansion unit 15. In addition, the emphasis pattern image generation unit 11 is an example of a generation unit. The far field estimation unit 13 is an example of an estimation unit.

The storage unit 20 is a semiconductor memory device (for example, a RAM or a flash memory), or a storage device (for example, a hard disk or an optical disk). The storage unit 20 includes circuit data 21, a circuit pattern image 22, an emphasis pattern image 23, simulation result data 24, and far field data 25.

The circuit data 21 is data used to generate a pattern image of the circuit. The circuit data 21 includes circuit data for teacher data used to generate a learning model, and target circuit data. The circuit data 21 is, for example, data in which, for each element included in the circuit, a position at which the element is disposed over the image and information on coupling between the element and another element are associated with each other. The circuit data 21 is stored in the storage unit 20 for each circuit. In addition, the circuit data 21 is generated by the data generation unit 14.

The circuit pattern image 22 is a pattern image of a circuit in which the circuit data 21 has been developed.

The emphasis pattern image 23 is an emphasis pattern image obtained by emphasizing the circuit pattern image 22 obtained by developing the circuit data 21 for teacher data. In addition, the emphasis pattern image 23 is generated by the emphasis pattern image generation unit 11.

The simulation result data 24 is data of a simulation result in the electromagnetic wave analysis with the emphasis pattern image 23 for the circuit data 21 for teacher data as an input. In other words, the simulation result data 24 is data of the far field executed by the simulation in a case where the emphasis pattern image 23 is used as an input of the simulation of the electromagnetic wave analysis. In addition, the simulation result data 24 is generated by the data generation unit 14.

The far field data 25 is data in a case where the emphasis pattern image 23 for the target circuit data 21 is applied to the learning model. The far field data 25 indicates the intensity of the electromagnetic waves of each frequency in the distant (predetermined distance) region of the electromagnetic waves radiated from the target circuit. In addition, the far field data 25 is estimated by the far field estimation unit 13.

The emphasis pattern image generation unit 11 generates the emphasis pattern image 23 that corresponds to the circuit data 21. For example, the emphasis pattern image generation unit 11 generates the circuit pattern image 22 from the circuit data 21. In addition, the emphasis pattern image generation unit 11 generates the emphasis pattern image 23 obtained by emphasizing the target element of the circuit pattern image 22 by the emphasizing method that corresponds to the type of each target element with respect to the target element (a synonym for "emphasis element") which is at least a part of elements included in the circuit indicated by the circuit pattern image 22. The term "target element" used here refers to an element included in a circuit and having a large influence on radiation of electromagnetic waves. The target element is indicated from the outside, for example. In addition, the emphasis pattern image generation unit 11 generates each of the emphasis pattern images 23 that corresponds to the circuit data 21 for teacher data and the target circuit data 21 which are used to generate a learning model.

Here, the emphasizing method that corresponds to the type of the target element and is performed by the emphasis pattern image generation unit 11 will be described hereinafter.

As an example, in a case where the target element is a wiring, the emphasis pattern image generation unit 11 emphasizes the circuit pattern image 22 based on the length of the wiring and the distance from the wiring. The wiring has characteristics that, as the total length increases, the intensity of the electromagnetic waves over the wiring increases, the distance from the wiring increases, and accordingly, the intensity of the electromagnetic waves attenuates. Therefore, the emphasis pattern image generation unit 11 assigns a value determined based on the total length to a point over the wiring, and assigns a value to be reduced corresponding to the distance from the wiring to the other points. The wiring as the target element requires to satisfy a predetermined length. The predetermined length may be a length that is affected by the electromagnetic waves with respect to the radiation of the electromagnetic waves.

As another example, in a case where the target element is a device, the emphasis pattern image generation unit 11 emphasizes the circuit pattern image 22 based on a mismatching amount of characteristic impedances between the device and the wiring coupled to the device. In a case where a device which is largely different from the wiring in characteristic impedances is inserted into the circuit, reflection occurs in the device. Therefore, in the emphasis pattern image generation unit 11, one wiring coupled to the device is defined as two wirings divided at the position of the device, and for each wiring, a value determined based on the total length is assigned to the point over the wiring, and a value that attenuates corresponding to the distance from the wiring is assigned to the other points. The device as the target element requires to be a device which is largely different from the wiring in characteristic impedances.

As another example, in a case where the target element is a by-pass capacitor, the emphasis pattern image generation unit 11 entirely reduces the value for the wiring coupled to the by-pass capacitor. The by-pass capacitor is intended to reduce noise, and is a capacitor that couples a power source line to a ground. Therefore, the emphasis pattern image generation unit 11 entirely reduces the value for the wiring coupled to the by-pass capacitor.

The learning model generation unit 12 generates a learning model. For example, the learning model generation unit 12 acquires the emphasis pattern image 23 generated by the emphasis pattern image generation unit 11 for each circuit data 21 for teacher data. The learning model generation unit 12 acquires the simulation result data 24 for each circuit data 21 from the storage unit 20, for each circuit data 21 for teacher data. In addition, for each circuit data 21 for teacher data, the learning model generation unit 12 inputs the teacher data in which the corresponding emphasis pattern image 23 and the simulation result data 24 are paired with each other, into each learning device, and generates a learning model. The simulation result data 24 that corresponds to the circuit data 21 referred to here means the far field data of the correct solution of the circuit data 21.

The far field estimation unit 13 estimates the far field of the electromagnetic waves radiated from the circuit indicated by the circuit data 21 by the learning model, using the emphasis pattern image 23 that corresponds to the target circuit data 21. For example, the far field estimation unit 13 acquires the emphasis pattern image 23 generated by the emphasis pattern image generation unit 11 for the target circuit data 21. The far field estimation unit 13 inputs the emphasis pattern image 23 into the learning model, and estimates the far field of the electromagnetic waves of the circuit indicated by the target circuit data 21 by the learning model.

The data generation unit 14 generates the circuit data 21 for learning and also generates the simulation result data 24 for the generated circuit data 21. For example, the data generation unit 14 receives designation of a dimension having a large influence on the far field of the electromagnetic waves, and generates the circuit data 21 uniformly distributed for the dimension received by the designation. An example of the dimension is a reciprocal number of the circuit length. Since a peak frequency is determined by the reciprocal number of the circuit length, the circuit data 21 that is equal to the reciprocal number of the circuit length is generated. As an example, in a case where the circuit lengths are d1, d2, and d3, the data generation unit 14 generates the circuit data 21 such that the lengths of 1/d1 and 1/d2 are equal to the lengths of 1/d2 and 1/d3. In addition, the data generation unit 14 acquires the emphasis pattern image 23 generated by the emphasis pattern image generation unit 11 for the generated circuit data 21. Further, the data generation unit 14 executes the simulation with respect to the emphasis pattern image 23. In addition, the data generation unit 14 stores the circuit data 21 and the simulation result data 24 in the storage unit 20 in association with each other.

The data expansion unit 15 expands the learning data. In other words, the data expansion unit 15 expands the circuit pattern image 22 for the circuit data 21 for teacher data. For example, the data expansion unit 15 generates the circuit pattern image 22 from the circuit data 21 for teacher data. The data expansion unit 15 receives designation of a predetermined element having a small influence on the far field of the electromagnetic waves, and generates the plurality of circuit pattern images 22 in which the position of the element that has received the designation is varied, among the generated circuit pattern images 22. The data expansion unit 15 executes the simulation with respect to the plurality of generated circuit pattern images 22 and calculates the simulation result data 24. The variation of the position of the element means, for example, translating the element or rotating the element. In addition, the data expansion unit 15 specifies a variation range in which the simulation result data 24 does not change. Further, the data expansion unit 15 expands each circuit data 21 for the plurality of circuit pattern images 22 in the specified variation range as the circuit data 21 for teacher data. In other words, regarding the circuit data 21 for the plurality of circuit pattern images 22 in the variation range in which simulation result data 24 does not change, the simulation result data 24 to be paired as teacher data is the same. This is because, even when the circuit positions change, and even when an angle of the circuit changes, the electromagnetic waves at a distance of 10 m is less affected. Accordingly, in the data expansion unit 15, it is possible to make the far field estimation results the same when the simulation results are the same circuit even when the circuit positions are different.

One Example of Emphasis Pattern Image Generation Processing

Figure 3:
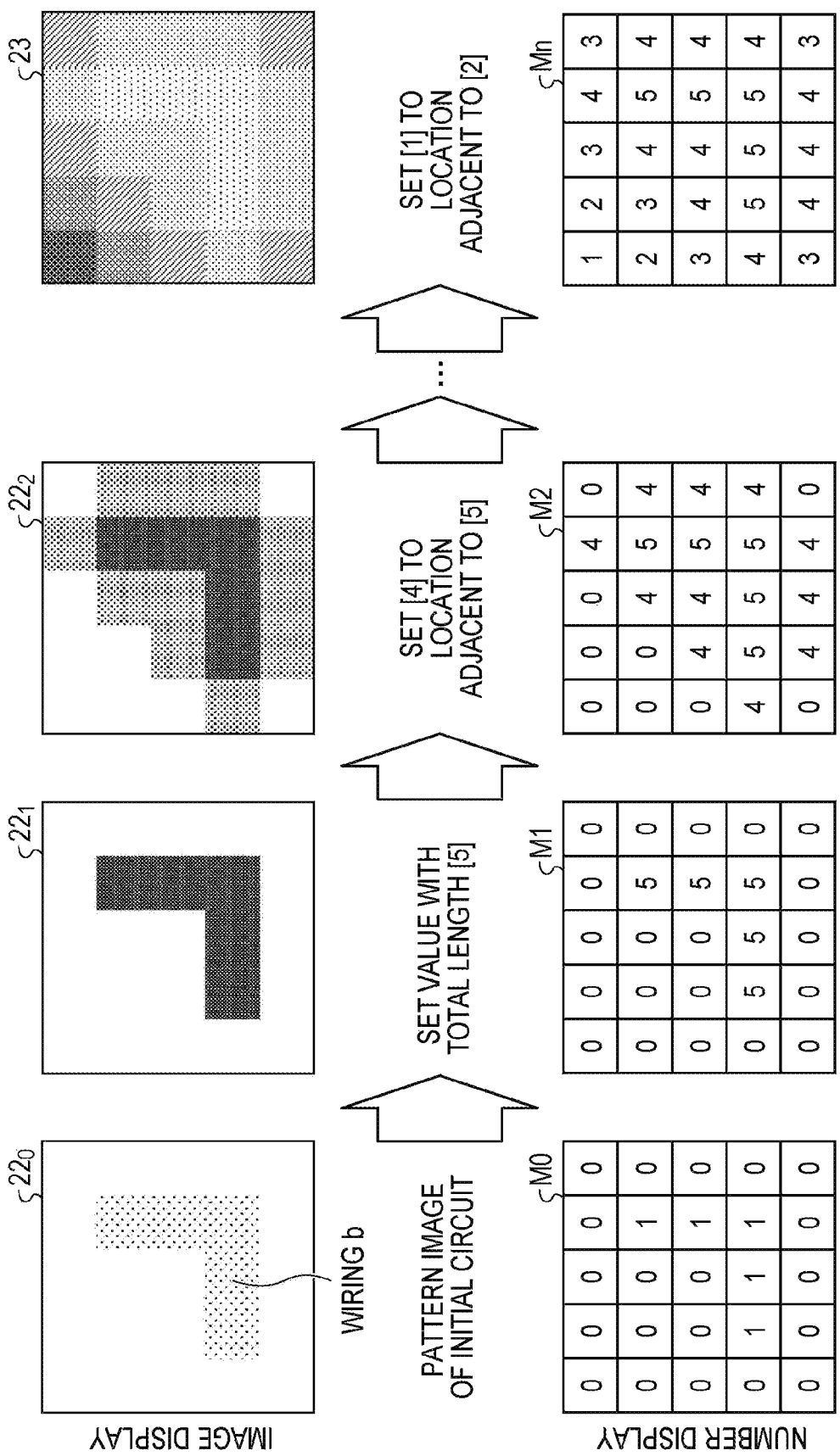
FIG. 3 is a view illustrating an example of emphasis pattern image generation processing according to Example 1.
Figure 4:
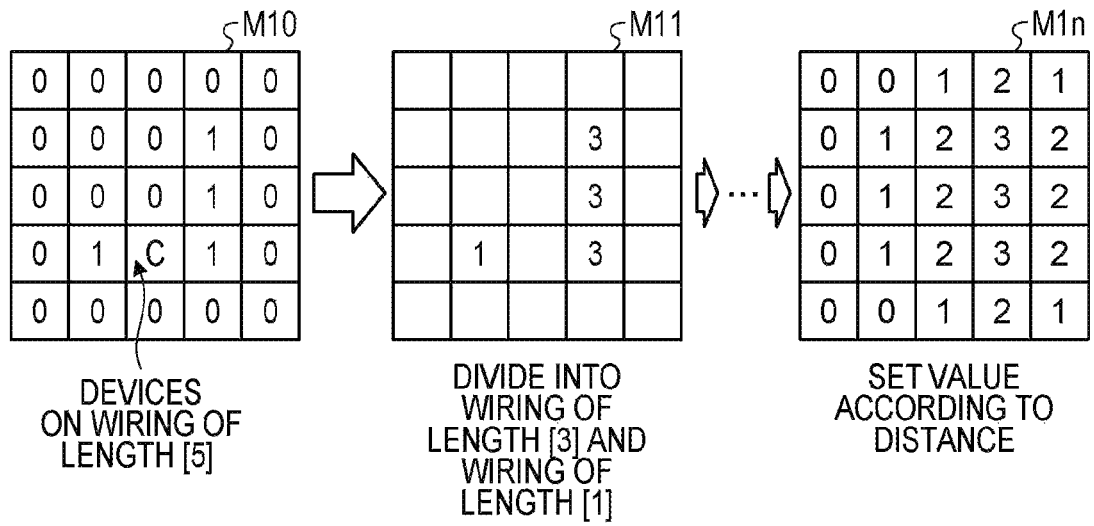
FIG. 4 is a view illustrating another example of the emphasis pattern image generation processing according to Example 1.
Figure 5:
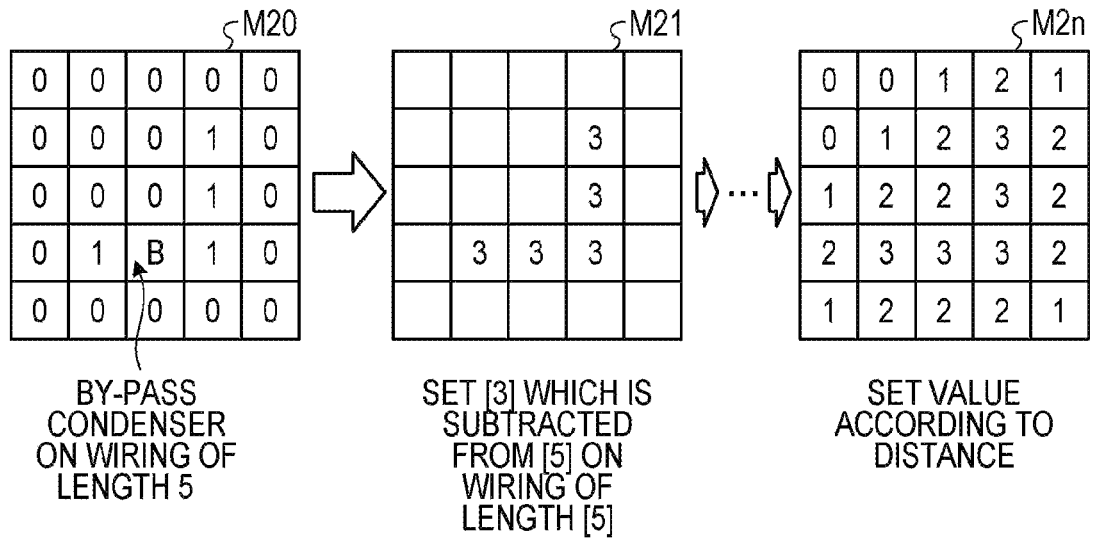
FIG. 5 is a view illustrating still another example of the emphasis pattern image generation processing according to Example 1.

Next, an example of emphasis pattern image generation processing performed by the emphasis pattern image generation unit 11 according to Example 1 will be described with reference to FIGS. 3 to 5. FIG. 3 is a view illustrating an example of the emphasis pattern image generation processing according to Example 1. FIGS. 4 and 5 are views illustrating another example of the emphasis pattern image generation processing according to Example 1. FIG. 3 illustrates a case where the target element is a wiring. FIG. 4 illustrates a case where the target element is a device. FIG. 5 illustrates a case where the target element is a by-pass capacitor.

In FIG. 3, the process of generating the emphasis pattern image 23 from a circuit pattern image $22_0$ is illustrated. First, the circuit pattern image $22_0$ is an image of an initial circuit generated from the circuit data 21. In the circuit pattern image $22_0$, a wiring b having a total length of "5" is drawn. A number display of the circuit pattern image $22_0$ is indicated by a symbol M0. Here, points over the wiring b are indicated by "1", and the other points are indicated by "0".

In a case where the target element is a wiring, the emphasis pattern image generation unit 11 emphasizes the circuit pattern image $22_0$ based on the length of the wiring b and the distance from the wiring b. In other words, the emphasis pattern image generation unit 11 assigns a value determined based on the total length to points over the wiring b having the total length "5", and assigns a value to be reduced corresponding to the distance from the wiring to the other points.

Here, as illustrated in the number display of a symbol M1, the emphasis pattern image generation unit 11 sets a value that corresponds to the total length "5", for example, to be "5", to the points over the wiring b. In addition, although it has been described that the emphasis pattern image generation unit 11 sets "5" as a value that corresponds to the total length "5", not being limited thereto, a value that corresponds to a predetermined total length may be set. An image display for a number display of the symbol M1 is an image $22_1$. Next, as illustrated in the number display of a symbol M2, the emphasis pattern image generation unit 11 sets a value "4" to the points adjacent to the value "5". An image display for the number display of the symbol M2 is an image $22_2$. Furthermore, the emphasis pattern image generation unit 11 repeatedly sets a value to be reduced at the points adjacent to the value set most recently. In addition, as illustrated in the number display of a symbol Mn, the emphasis pattern image generation unit 11 sets a value "1" to the points adjacent to the value "2". An image display for the number display of the symbol Mn is the emphasis pattern image 23. In addition, in FIG. 3, as the value of the pixel in the number display of the symbol Mn decreases, the pixel of the corresponding emphasis pattern image 23 is expressed in darker color, and the black and white of the patterns 22 and 23 are reversed. The same also applies to the following FIGS. 6A, 6B, and 14.

As illustrated in FIG. 4, in a case where the target element is a device, the emphasis pattern image generation unit 11 emphasizes the circuit pattern image 22 based on the mismatching amount of the characteristic impedances between the device and the wiring coupled to the device. In other words, in the emphasis pattern image generation unit 11, one wiring coupled to the device is defined as two wirings divided at the position of the device. In addition, for each wiring, the emphasis pattern image generation unit 11 assigns a value determined based on the total length to points over the wiring, and assigns a value to be reduced corresponding to the distance from the wiring to the other points.

Here, a process of generating the emphasis pattern image 23 from the circuit pattern image 22 in a case where the device is coupled to the wiring b illustrated in FIG. 3, is illustrated.

As illustrated in the number display of a symbol M10, the points over the device coupled to the wiring b of the length "5" are indicated by "C", the other points over the wiring b are indicated by "1", and the other points are indicated by "0". Next, as illustrated in the number display of the symbol 11, in the emphasis pattern image generation unit 11, one wiring b coupled to the device is defined as the two wirings divided at the position of the device. In other words, the wiring b is divided into a wiring of the length "3" and a wiring of the length "1". In addition, the emphasis pattern image generation unit 11 sets the value "1" to the points over the wiring for the wiring of the total length "1", and sets the value "3" to the points over the wiring for the wiring of the total length "3". In addition, as illustrated in the number display of a symbol M1n, the emphasis pattern image generation unit 11 sets a value that corresponds to the distance. An image display for the number display of the symbol M1n is the emphasis pattern image 23.

As illustrated in FIG. 5, in a case where the target element is a by-pass capacitor, the emphasis pattern image generation unit 11 entirely reduces the value for the wiring coupled to the by-pass capacitor. In addition, the emphasis pattern image generation unit 11 assigns a value to be reduced corresponding to the distance from the wiring, to the points other than the wiring.

Here, a process of generating the emphasis pattern image 23 from the circuit pattern image 22 in a case where the by-pass capacitor is coupled to the wiring b illustrated in FIG. 3, is illustrated.

As illustrated in the number display of a symbol M20, the points over the by-pass capacitor coupled to the wiring b of the length "5" are indicated by "B", the other points over the wiring b are indicated by "1", and the other points are indicated by "0". Next, as illustrated in the number display of a symbol M21, the emphasis pattern image generation unit 11 is a value of a point over the wiring b of the length "5" from the value "5" to the value "3" as a whole. In addition, as illustrated in the number display of a symbol M2n, the emphasis pattern image generation unit 11 sets a value that corresponds to the distance. An image display for the number display of the symbol M2n is the emphasis pattern image 23.

One Example of Emphasis Pattern Image

Figure 6A:
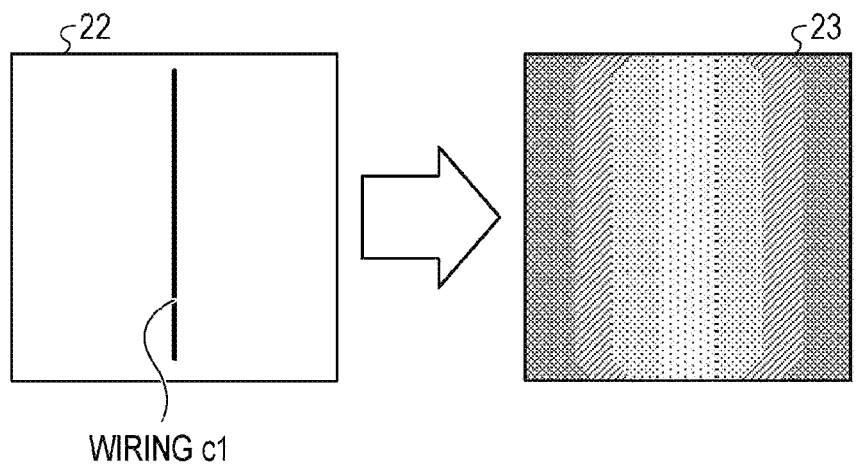
FIG. 6A is a view illustrating an example of an emphasis pattern image according to Example 1.
Figure 6B:
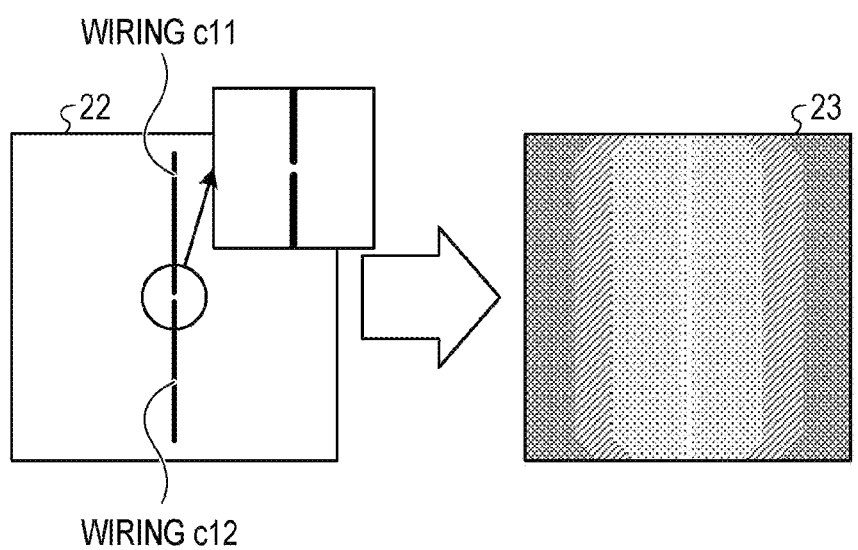
FIG. 6B is a view illustrating another example of the emphasis pattern image according to Example 1.

Next, an example of the emphasis pattern image 23 according to Example 1 will be described with reference to FIGS. 6A and 6B. FIG. 6A is a view illustrating an example of the emphasis pattern image according to Example 1. FIG. 6B is a view illustrating another example of the emphasis pattern image according to Example 1.

As illustrated in the left figure of FIG. 6A, the circuit pattern image 22 is illustrated. A wiring c1 is drawn on the circuit pattern image 22. In addition, when the designation of "wiring" is received as the target element, the emphasis pattern image generation unit 11 emphasizes the circuit pattern image 22 based on the length of the wiring c1 and the distance from the wiring c1. As a result, as illustrated on the right figure of FIG. 6A, the emphasis pattern image 23 obtained by emphasizing the circuit pattern image 22 is illustrated.

As illustrated in the left figure of FIG. 6B, the circuit pattern image 22 is illustrated. A wiring c11 and a wiring c12 are drawn on the circuit pattern image 22. The wiring c11 and the wiring c12 are wirings that are parts obtained by dividing a part of the wiring c1 illustrated in FIG. 6A, In addition, when the designation of "wiring" is received as the target element, the emphasis pattern image generation unit 11 emphasizes the circuit pattern image 22 based on the length of the wiring c11 and the distance from the wiring c11 and the length of the wiring c12 and the distance from the wiring c12. As a result, as illustrated on the right figure of FIG. 6B, the emphasis pattern image 23 obtained by emphasizing the circuit pattern image 22 is illustrated.

Accordingly, even in a case where the circuits are different as illustrated in the left figure of FIG. 6A and the left figure of FIG. 6B, for example, the emphasis pattern image generation unit 11 generates different emphasis pattern images 23 that correspond to each of the circuits, and accordingly, it is possible to estimate the far fields that correspond to each of the circuits.

One Example of Data Expansion

Figure 7:
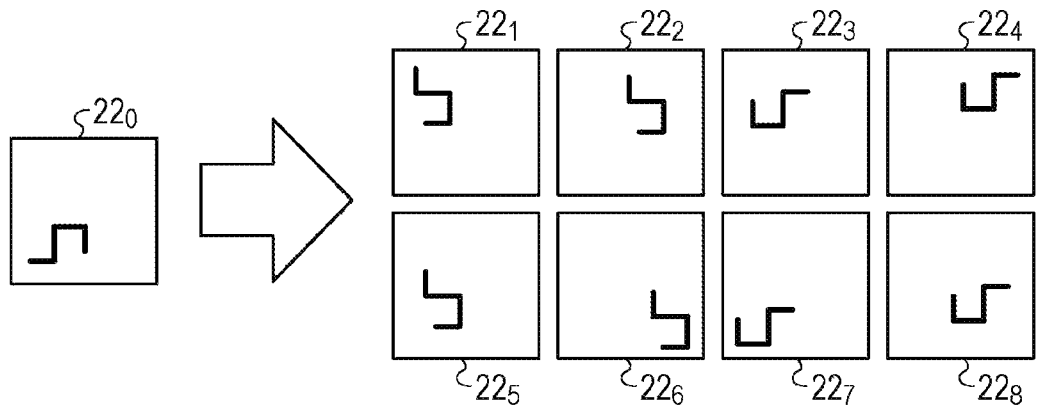
FIG. 7 is a view illustrating an example of data expansion according to Example 1.

Next, an example of data expansion according to Example 1 will be described with reference to FIG. 7. FIG. 7 is a view illustrating an example of the data expansion according to Example 1.

As illustrated in FIG. 7, the circuit pattern image $22_0$ as one pattern of the circuit is illustrated. In the circuit pattern image $22_0$, a wiring having a small influence on the far field of the electromagnetic waves is drawn. When the data expansion unit 15 receives the designation of the wiring having a small influence on the far field of the electromagnetic waves, the data expansion unit 15 generates the plurality of circuit pattern images 22 in which the position of the wiring is varied due to shift or rotation. Here, it is assumed that circuit pattern images $22_1$ to $22_8$ are generated.

In addition, the data expansion unit 15 executes the simulation with respect to the plurality of generated circuit pattern images 22 and specifies the variation range in which the simulation result data 24 does not change. Here, the data expansion unit 15 executes the simulation with respect to the circuit pattern images $22_1$ to $22_8$. In addition, the data expansion unit 15 compares the simulation result data 24 of the circuit pattern image $22_0$ with the simulation result data 24 of the circuit pattern images $22_1$ to $22_8$, and specifies the variation range in which the simulation result data 24 does not change.

Further, the data expansion unit 15 expands each circuit data 21 for the plurality of circuit pattern images 22 in the specified variation range as the circuit data 21 for teacher data. In other words, regarding the circuit data 21 for the plurality of circuit pattern images 22 in the variation range in which simulation result data 24 does not change, the simulation result data 24 to be paired as teacher data is the same. Here, the circuit data 21 of the circuit pattern image 22 which is not different from the simulation result data 24 of the circuit pattern image $22_0$ among the circuit pattern images $22_1$ to $22_8$ expands as the circuit data 21 for teacher data.

Flowchart of Learning Model Generation Processing

Figure 8:
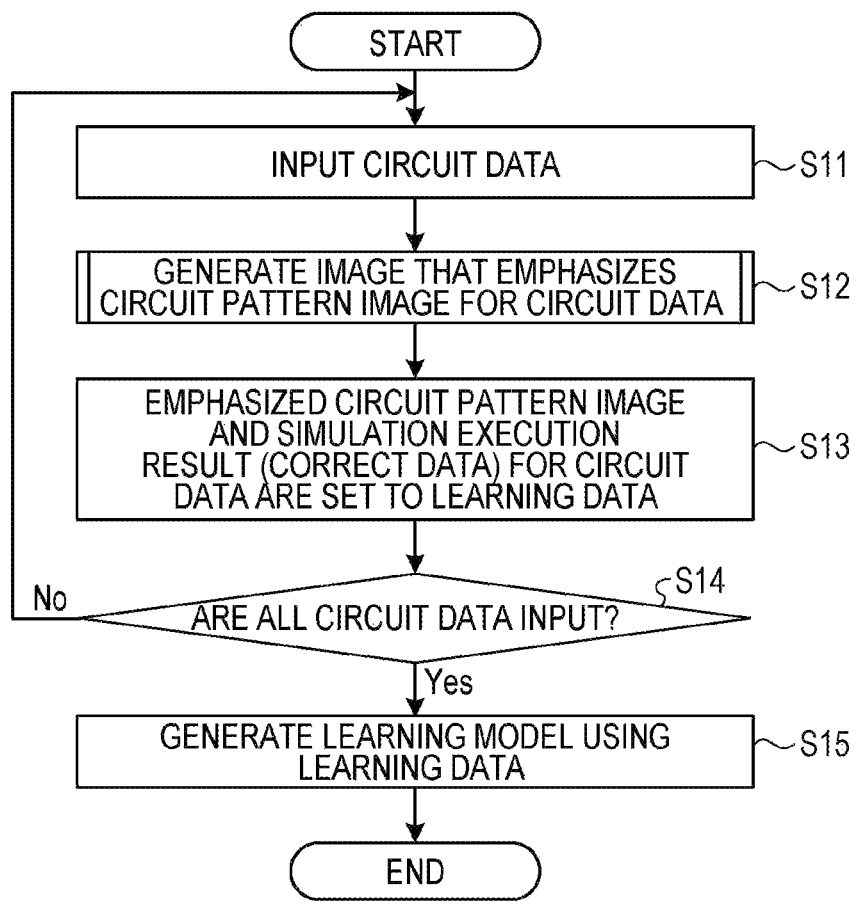
FIG. 8 is a view illustrating an example of a flowchart of learning model generation processing according to Example 1.

FIG. 8 is a view illustrating an example of a flowchart of learning model generation processing according to Example 1.

As illustrated in FIG. 8, the learning model generation unit 12 inputs the circuit data 21 for learning data (step S11). The learning model generation unit 12 calls the emphasis pattern image generation processing to generate the emphasis pattern image 23 obtained by emphasizing the circuit pattern image 22 for the circuit data 21 (step S12). In addition, a flowchart of the generation processing of the emphasis pattern image 23 will be described later.

Further, the learning model generation unit 12 sets the emphasis pattern image 23 obtained by emphasizing the circuit pattern image 22 and the simulation execution result (correct data) for the circuit data 21, as learning data (step S13).

In addition, the learning model generation unit 12 determines whether all of the circuit data 21 for learning data are input (step S14), In a case where it is determined that all of the circuit data 21 for learning data are not input (step S14; No), the learning model generation unit 12 proceeds to step S11 in order to input the next circuit data 21 for learning data.

Meanwhile, in a case where it is determined that all of the circuit data 21 for learning data are input (step S14; Yes), the learning model generation unit 12 generates a learning model using the learning data (step S15). In addition, the learning model generation unit 12 ends the learning model generation processing.

Flowchart of Far Field Estimation Processing

Figure 9:
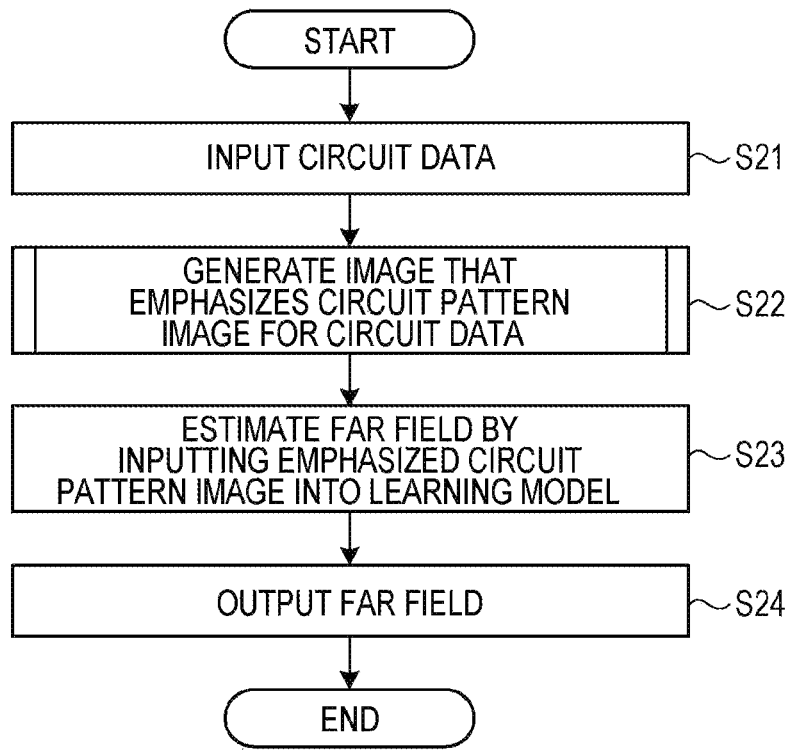
FIG. 9 is a view illustrating an example of a flowchart of far field estimation processing according to Example 1.

FIG. 9 is a view illustrating an example of a flowchart of far field estimation processing according to Example 1.

As illustrated in FIG. 9, the far field estimation unit 13 inputs the target circuit data 21 (step S21). The far field estimation unit 13 calls the emphasis pattern image generation processing to generate the emphasis pattern image 23 obtained by emphasizing the circuit pattern image 22 for the circuit data 21 (step S22). In addition, a flowchart of the generation processing of the emphasis pattern image 23 will be described later.

Further, the far field estimation unit 13 inputs the emphasis pattern image 23 obtained by emphasizing the circuit pattern image 22 into the learning model to estimate the far field (step S23). In addition, the far field estimation unit 13 outputs the estimated far field (step S24). Further, the far field estimation unit 13 ends the far field estimation processing.

Flowchart of Emphasis Pattern Image Generation Processing

Figure 10:
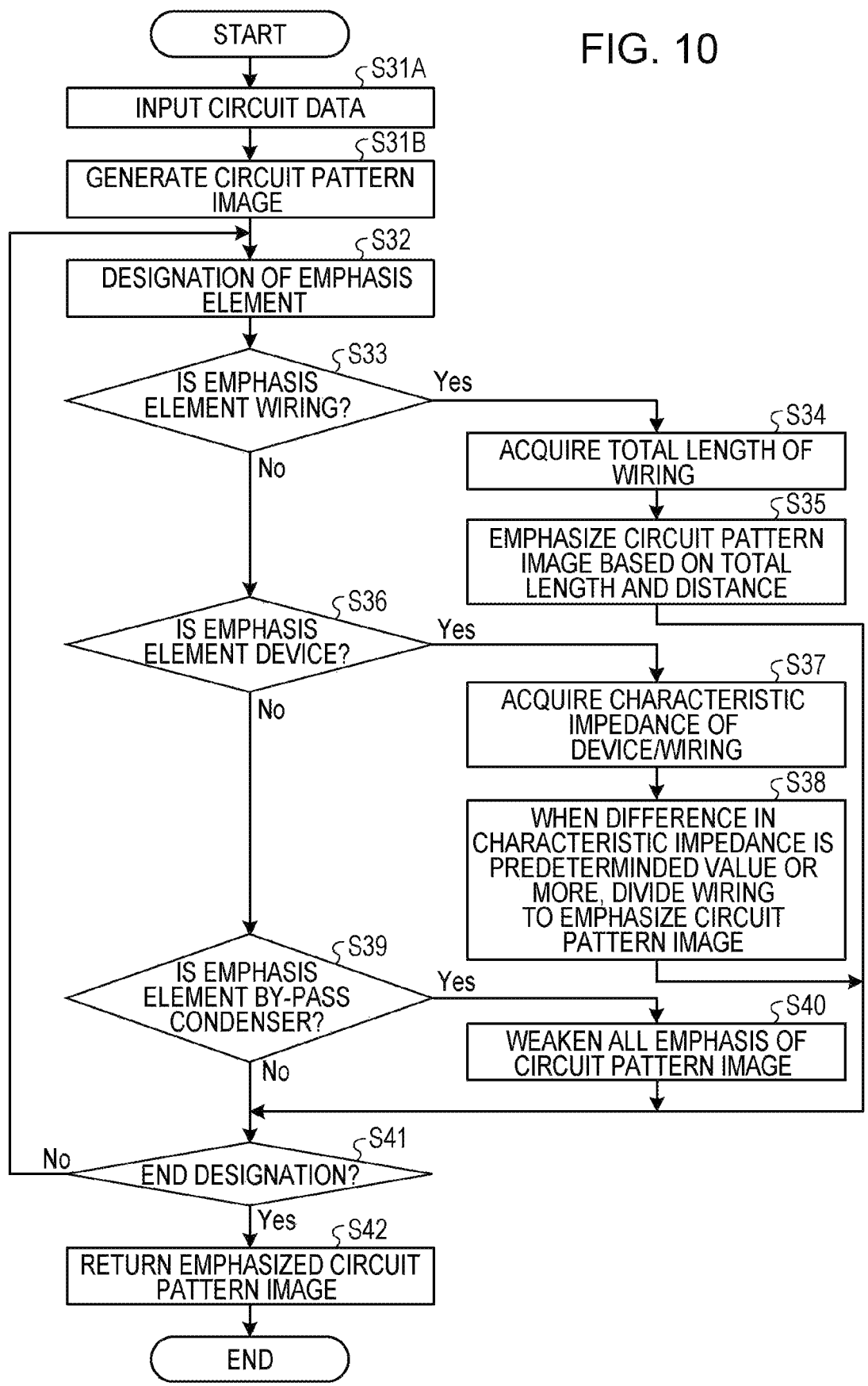
FIG. 10 is a view illustrating an example of a flowchart of the emphasis pattern image generation processing according to Example 1.

FIG. 10 is a view illustrating an example of a flowchart of the emphasis pattern image generation processing according to Example 1.

As illustrated in FIG. 10, the emphasis pattern image generation unit 11 inputs the circuit data 21 (step S31A). The emphasis pattern image generation unit 11 develops the circuit data 21 to generate the circuit pattern image 22 (step S318).

The emphasis pattern image generation unit 11 inputs the designation of the emphasis element (step S32). In addition, the emphasis pattern image generation unit 11 determines whether the emphasis element is a wiring (step S33).

In a case where it is determined that the emphasis element is a wiring (step S33; Yes), the emphasis pattern image generation unit 11 acquires the total length of the wiring from, for example, the circuit data 21 (step S34). In addition, the emphasis pattern image generation unit 11 emphasizes the circuit pattern image 22 based on the total length of the wiring and the distance from the wiring (step S35). This is because of the characteristics that, as the total length of the wiring increases, the intensity over the wiring increases, the distance from the wiring increases, and accordingly, the intensity attenuates. In addition, the emphasis pattern image generation unit 11 proceeds to step S41.

Meanwhile, in a case where it is determined that the emphasis element is not a wiring (step S33; No), the emphasis pattern image generation unit 11 determines whether the emphasis element is a device (step S36).

In a case where it is determined that the emphasis element is a device (step S36; Yes), the emphasis pattern image generation unit 11 acquires the characteristic impedances between the device and the wiring coupled to the device from, for example, the circuit data 21 (step S37). In addition, when the difference in characteristic impedances is a predetermined value or more, the emphasis pattern image generation unit 11 divides the wiring at the position of the device to emphasize the circuit pattern image 22 (step S38). This is because, in a case where a device which is largely different from the wiring in characteristic impedances is inserted, reflection occurs in the device. In addition, the emphasis pattern image generation unit 11 proceeds to step S41.

Meanwhile, in a case where it is determined that the emphasis element is not a device (step S36; No), the emphasis pattern image generation unit 11 determines whether the emphasis element is a by-pass capacitor (step S39).

In a case where it is determined that the emphasis element is a by-pass capacitor (step S39; Yes), the emphasis pattern image generation unit 11 weakens the entire intensity of the circuit pattern image 22 (step S40). This is because the by-pass capacitor is intended to reduce noise, and couples the power source line to the ground. In addition, the emphasis pattern image generation unit 11 proceeds to step S41.

Meanwhile, in a case where it is determined that the emphasis element is not a by-pass capacitor (step S39; No), the emphasis pattern image generation unit 11 proceeds to step S41.

In step S41, the emphasis pattern image generation unit 11 determines whether the designation of the emphasis element is finished (step S41). In a case where it is determined that the designation of the emphasis element is not finished (step S41; No), the emphasis pattern image generation unit 11 proceeds to step S32 to designate the next emphasis element.

Meanwhile, in a case where it is determined that the designation of the emphasis element is finished (step S41; Yes), the emphasis pattern image generation unit 11 calls the emphasis pattern image 23 obtained by emphasizing the circuit pattern image 22 and return the emphasis pattern image 23 (step S42). In addition, the emphasis pattern image generation unit 11 ends the emphasis pattern image generation processing.

Flowchart of Data Generation Processing

Figure 11:
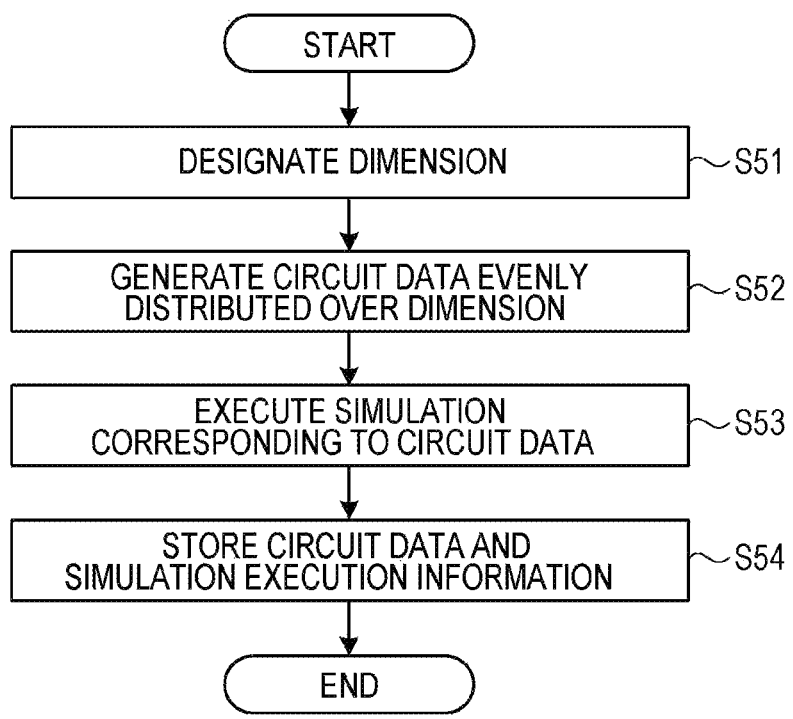
FIG. 11 is a view illustrating an example of a flowchart of data generation processing according to Example 1.

FIG. 11 is a view illustrating an example of a flowchart of data generation processing according to Example 1.

As illustrated in FIG. 11, the data generation unit 14 receives designation of a dimension having a large influence on the far field of the electromagnetic waves (step S51). For example, the dimension is the reciprocal number of the circuit length. The data generation unit 14 generates the circuit data 21 evenly distributed for the dimension received by the designation (step S52).

In addition, the data generation unit 14 executes simulation with respect to the circuit data 21 (step S53). For example, the data generation unit 14 calls the emphasis pattern image generation processing to generate the emphasis pattern image 23 obtained by emphasizing the circuit pattern image 22 for the circuit data 21. The data generation unit 14 executes the simulation with respect to the emphasis pattern image 23.

In addition, the data generation unit 14 stores the circuit data 21 and the simulation execution result (simulation result data 24) in the storage unit 20 in association with each other (step S54). Further, the data generation unit 14 ends the data generation processing.

Flowchart of Data Expansion Processing

Figure 12:
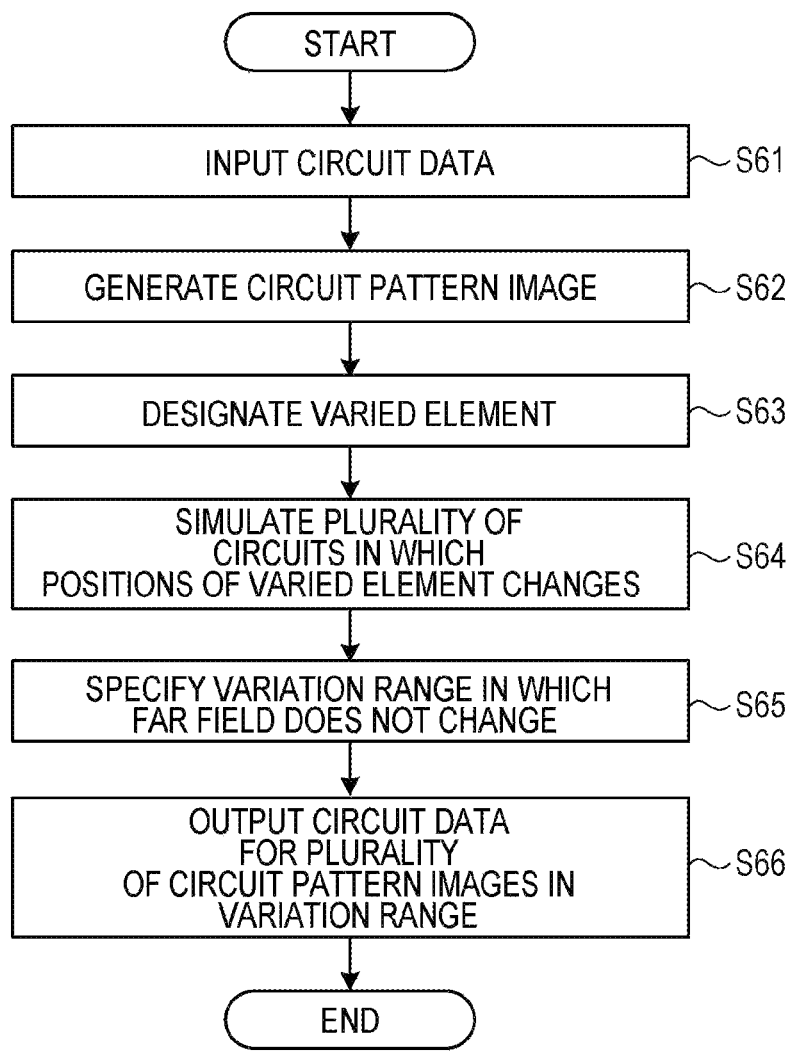
FIG. 12 is a view illustrating an example of a flowchart of data expansion processing according to Example 1.

FIG. 12 is a view illustrating an example of a flowchart of data expansion processing according to Example 1.

As illustrated in FIG. 12, the data expansion unit 15 inputs the circuit data 21 for learning data (step S61). The data expansion unit 15 develops the circuit data 21 to generate the circuit pattern image 22 (step S62).

The data expansion unit 15 inputs the designation of a varied element (step S63). The varied element is, for example, an element having a small influence on the far field of the electromagnetic waves. In addition, regarding the circuit pattern image 22, the data expansion unit 15 executes the simulation with respect to the plurality of circuit pattern images 22 in which the position of the varied element changes (step S64). Further, the data expansion unit 15 specifies a fluctuation range in which the far field does not change (step S65).

The data expansion unit 15 outputs the circuit data 21 for the plurality of circuit pattern images 22 in the variation range as the expanded circuit data 21 for teacher data (step S66). In other words, regarding the circuit data 21 for the plurality of circuit pattern images 22 in the variation range in which the simulation execution result (simulation result data 24) does not change, the simulation result data 24 to be paired as teacher data is the same.

One Example of Far Field Estimation Result

Figure 13:
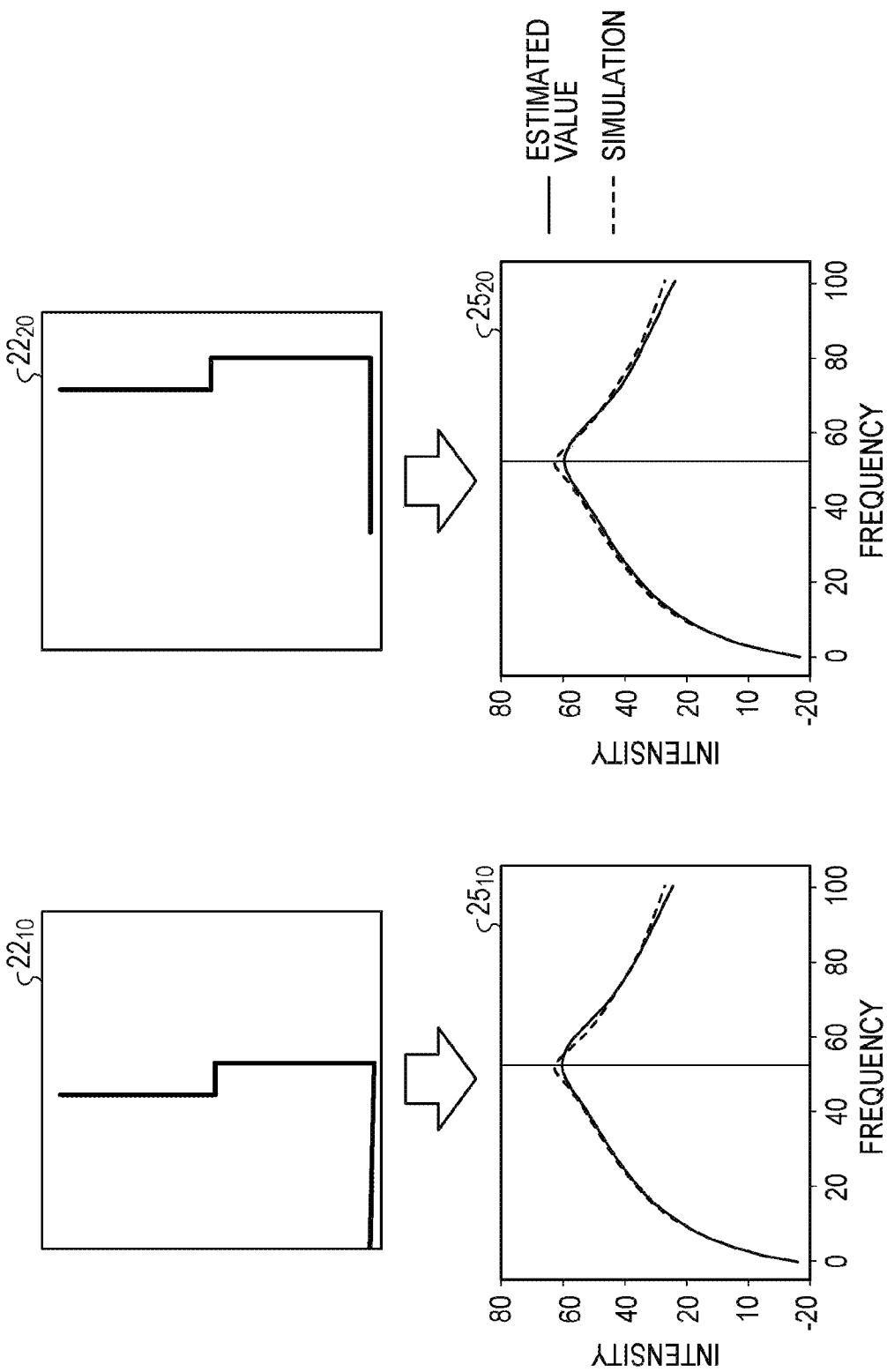
FIG. 13 is a view illustrating an example of a far field estimation result according to Example 1.
Figure 14:
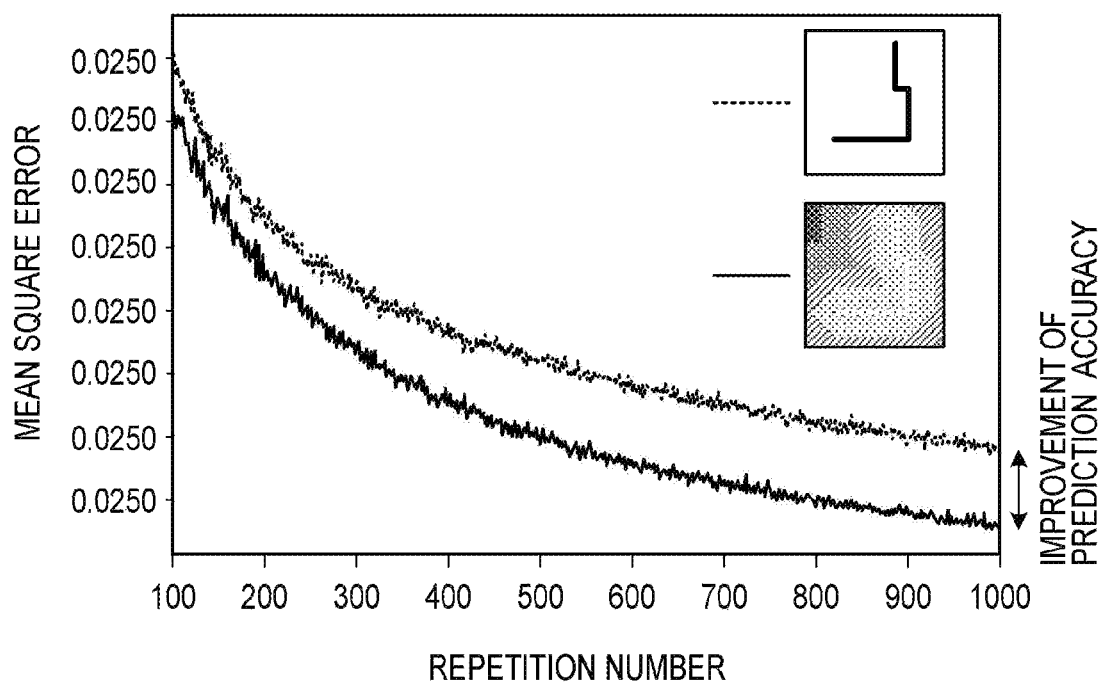
FIG. 14 is a view illustrating a prediction accuracy of the far field estimation result according to Example 1.

Here, an example of a far field estimation result according to Example 1 will be described with reference to FIGS. 13 and 14. FIG. 13 is a view illustrating an example of the far field estimation result according to Example 1. FIG. 14 is a view illustrating a prediction accuracy of the far field estimation result according to Example 1.

Here, 256 types of circuit patterns are used for the circuit data 21, parallel movement is performed with respect to one circuit pattern by the data expansion unit 15, and accordingly, one circuit pattern has expanded to 25 types of circuit patterns. Therefore, the number of circuit data 21 is (256× 25=) 6400. Further, the number of the simulation result data 24 is 256. In addition, the circuit data 21 is data of a circuit configured by only a single line. Further, the far field estimation target is the intensity of the electromagnetic waves for each of a plurality of frequencies (101 types). In addition, in the circuit data 21, 80% of all of the data is for teacher data, and 20% is for evaluation data.

FIG. 13 illustrates a case where the far field estimation processing is applied to two circuits having the same circuit but having different circuit positions, as the radiation of the electromagnetic waves. The two pieces of the circuit data 21 for evaluation data are used. In the upper left and upper right figures, circuit pattern images $22_{10}$ and $22_{20}$ of two circuits having the same circuit but having different circuit positions are illustrated as the radiation of the electromagnetic waves. In addition, far field data $25_{10}$ and $25_{20}$, which are far field estimation results obtained by applying the far field estimation processing to the two circuit pattern images $22_{10}$ and $22_{20}$, are illustrated in the lower left and lower right figures, respectively. Further, simulation results in a case where simulation of electromagnetic wave analysis is executed, is also added to the far field data $25_{10}$ and $25_{20}$.

Figure 19:
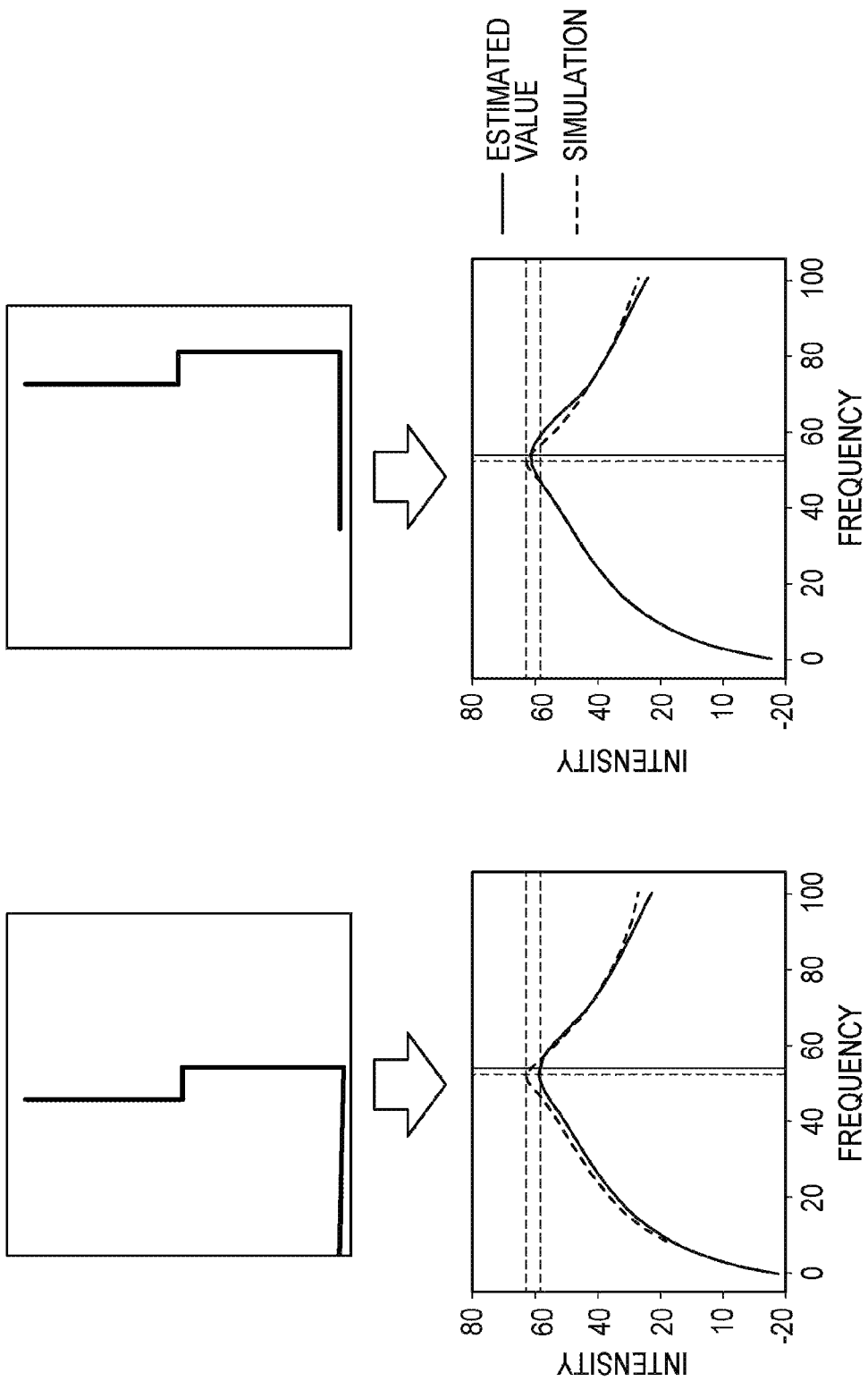
FIG. 19 is a view illustrating a reference example of a case where the estimation result is different depending on circuit positions.
Figure 20:
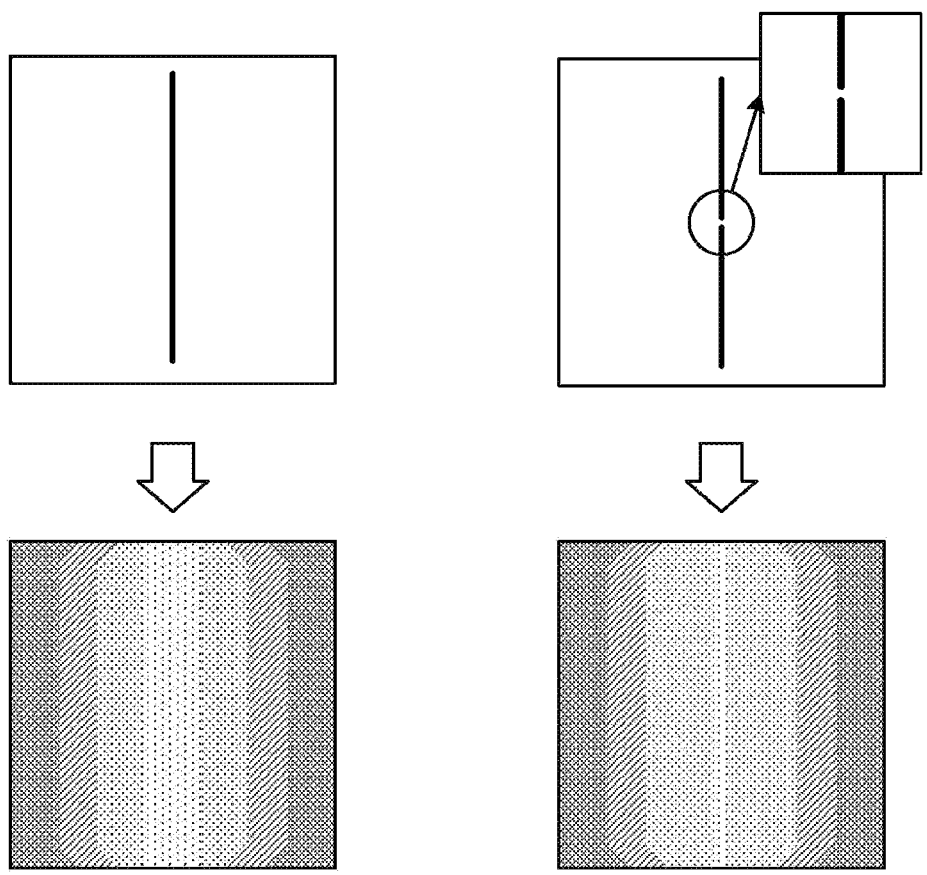
FIG. 20 is a view illustrating a reference example of a case where different circuits become similar images.

The far field data 25 is illustrated by a graph in which the X shaft is a frequency and the Y shaft is an intensity of the electromagnetic waves. The solid line indicates the estimation result (far field data 25) estimated by the far field estimation unit 13. The broken line indicates the simulation result in a case where the simulation is executed. The simulation results added to the far field data $25_{10}$ and $25_{20}$ are the same. In other words, it is illustrated that the circuit pattern images $22_{10}$ and $22_{20}$ are the same circuit as the radiation of the electromagnetic waves. The far field data $25_{10}$ and $25_{20}$ are substantially the same although there are parts that are slightly different. As a result, in the far field data $25_{10}$ and $25_{20}$ obtained by emphasizing and learning the circuit pattern images $22_{10}$ and $22_{20}$, compared to the far field data obtained by learning without emphasizing the circuit pattern images $22_{10}$ and $22_{20}$ (refer to FIG. 19), the difference in simulation result is reduced. In other words, when the circuits are the same circuit as the radiation of the electromagnetic waves, and even when the circuit positions are different, the estimation results of the far field of the electromagnetic waves estimated by the machine learning rarely change.

As illustrated in FIG. 14, in the far field data $25_{10}$ and $25_{20}$ obtained by emphasizing and learning the circuit pattern images $22_{10}$ and $22_{20}$, compared to the far field data obtained by directly learning from the circuit pattern images $22_{10}$ and $22_{20}$, as the number of times of repetition of learning increases, the prediction accuracy is improved. In other words, as the number of times of repetition of learning increases, the mean square error between the far field data after learning and the simulation result in a case of learning by emphasizing the circuit pattern images $22_{10}$ and $22_{20}$, than that in a case of directly learning from the circuit pattern images $22_{10}$ and $22_{20}$.

Effect of Example 1

According to the above-described Example 1, the estimation device 1 generates the emphasis pattern image 23 obtained by emphasizing each target element of the circuit pattern image 22 of the target circuit by the emphasizing method that corresponds to the type of each target element, with respect to the target element which is at least a part of elements included in the target circuit. The estimation device 1 estimates the far field of the electromagnetic waves radiated from the target circuit by an existing learning model using the emphasis pattern image 23. According to an aspect, in the estimation device 1, in a case of estimating the far field of the electromagnetic waves radiated from the circuit using the machine learning, it is possible to improve the estimation accuracy. In other words, in the estimation device 1, it is possible to estimate the far field of the electromagnetic waves with excellent accuracy by estimating the far field of the electromagnetic waves using the emphasis pattern image 23 obtained by the emphasizing method that corresponds to the type of the target element. In addition, in the estimation device 1, it is possible to estimate the far field of the electromagnetic waves at high speed by using the emphasis pattern image 23 obtained by emphasizing the target circuit for the input into the learning model instead of the simulation execution result.

In addition, the learning model is a model learned using the emphasis pattern image 23 obtained by emphasizing each target element of the circuit pattern image 22 of the circuit by the emphasizing method and a far field of correct solution (simulation result data 24), as learning data. According to the configuration, in the estimation device 1, it is possible to estimate the far field of the electromagnetic waves with excellent accuracy with respect to the target circuit by using the learning model in which the influence (near field) of the electromagnetic waves is taken into consideration.

In addition, in the estimation device 1, in a case where a far field indicating the simulation result for a first circuit approximates a far field indicating the simulation result for a second circuit in which the target element included in the first circuit is varied, the circuit pattern image 22 of the second circuit is added as the learning data. According to the configuration, in the estimation device 1, it is possible to easily increase the number of pieces of different learning data. In addition, in the estimation device 1, it is possible to make the far field estimation results the same when the simulation results are the same circuit even when the circuit positions are different.

Example 2

Incidentally, in Example 1, a case where the estimation device 1 generates the emphasis pattern image obtained by emphasizing the pattern image of the circuit by the method that corresponds to the type of the element included in the circuit, and estimates the far field of the electromagnetic waves of the target circuit using the generated emphasis pattern image, has been described. However, the estimation device 1 is not limited thereto, and similarly, there is also a case of estimating the far field of heat of the target circuit.

Here, in Example 2, a case where the estimation device 1 generates an emphasis pattern image obtained by emphasizing a pattern image of a circuit by a method that corresponds to a type of an element included in the circuit, and estimates the far field of the heat of a target circuit using the generated emphasis pattern image, will be described.

The emphasis pattern image generation unit 11 according to Example 2 generates the emphasis pattern image 23 that corresponds to the circuit data 21, regarding the radiation of the heat. For example, the emphasis pattern image generation unit 11 generates the circuit pattern image 22 from the circuit data 21. In addition, the emphasis pattern image generation unit 11 generates the emphasis pattern image 23 obtained by emphasizing the target element of the circuit pattern image 22 by the emphasizing method that corresponds to the type of each target element, regarding the radiation of the heat, with respect to the target element (a synonym for "emphasis element") which is at least a part of elements included in the circuit indicated by the circuit pattern image 22. The term "target element" used here refers to an element included in a circuit and having a large influence on the radiation of the heat. The target element is indicated from the outside, for example. In addition, the emphasis pattern image generation unit 11 generates each of the emphasis pattern images 23 that corresponds to the circuit data 21 for teacher data and the target circuit data 21 which are used to generate a learning model.

Here, the emphasizing method that corresponds to the type of the target element and is performed by the emphasis pattern image generation unit 11, regarding the radiation of the heat, will be described hereinafter.

As an example, in a case where the target element is a wiring, the emphasis pattern image generation unit 11 emphasizes the circuit pattern image 22 based on the length of the wiring, the thickness of the wiring, and the distance from the wiring. The wiring has characteristics that, as the total length of the wiring increases, and as the thickness increases, the intensity of the heat over the wiring increases, the distance from the wiring increases, and accordingly, the intensity of the heat attenuates. Therefore, the emphasis pattern image generation unit 11 assigns a value determined based on the total length and the thickness to points over the wiring, and assigns a value to be reduced corresponding to the distance from the wiring to the other points. The wiring as the target element requires to satisfy a predetermined length and a predetermined thickness. The predetermined length may be a length that is affected by the radiation of the heat. The predetermined thickness may be a thickness that is affected by the radiation of the heat.

As another example, in a case where the target element is a device, the emphasis pattern image generation unit 11 emphasizes the circuit pattern image 22 based on a resistance value of the device and the distance from the device. The device has characteristics that, as the resistance increases, the intensity of the heat in the device increases. Therefore, the emphasis pattern image generation unit 11 assigns a value determined based on the resistance of the device to points over the device, and assigns a value to be reduced corresponding to the distance from the device to the other points. The device as the target element requires to satisfy a predetermined resistance value. The predetermined resistance value may be a resistance value that is affected by the radiation of the heat.

One Example of Emphasis Pattern Image Generation Processing

Figure 15:
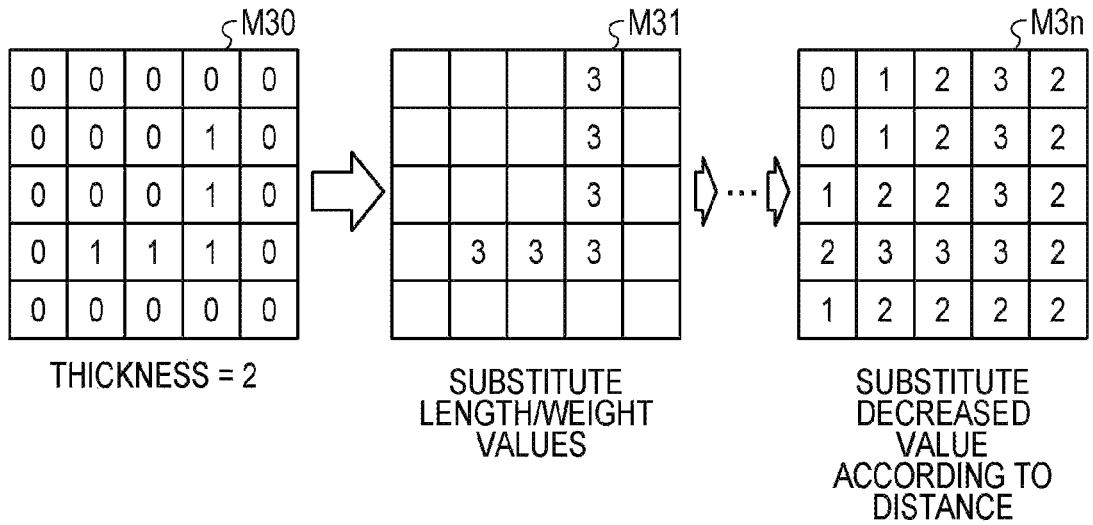
FIG. 15 is a view illustrating an example of emphasis pattern image generation processing according to Example 2.
Figure 16:
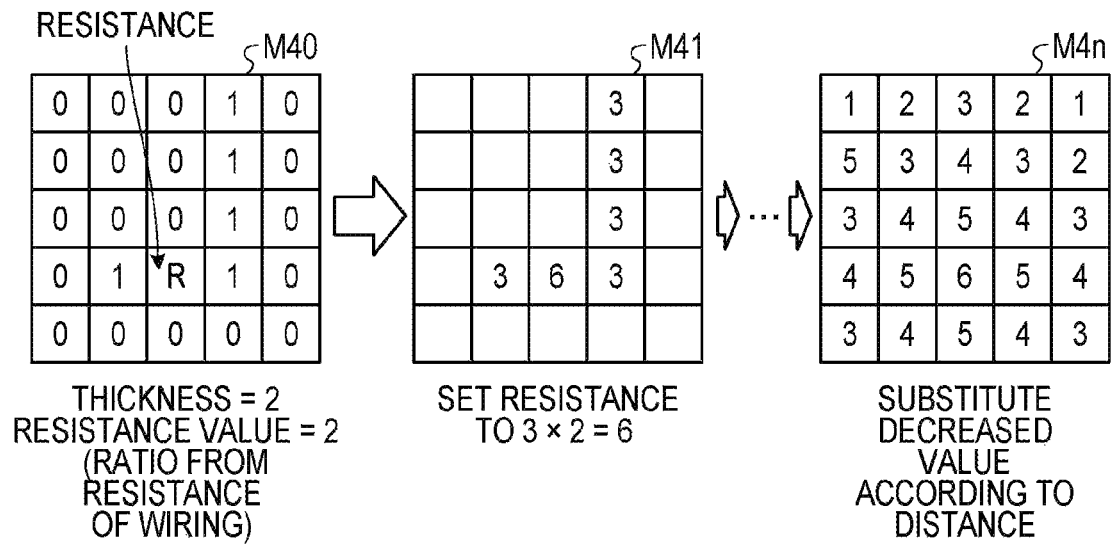
FIG. 16 is a view illustrating another example of the emphasis pattern image generation processing according to Example 2.

Next, an example of emphasis pattern image generation processing performed by the emphasis pattern image generation unit 11 according to Example 2 will be described with reference to FIGS. 15 and 16. FIG. 15 is a view illustrating an example of the emphasis pattern image generation processing according to Example 2. FIG. 16 is a view illustrating another example of the emphasis pattern image generation processing according to Example 2. FIG. 15 indicates a case where the target element is a wiring. FIG. 16 indicates a case where the target element is a device.

As illustrated in FIG. 15, in a case where the target element is a wiring, the emphasis pattern image generation unit 11 emphasizes the circuit pattern image 22 based on the length of the wiring, the thickness of the wiring, and the distance from the wiring. In other words, the emphasis pattern image generation unit 11 assigns a value determined based on the total length and the thickness to points over the wiring, and assigns a value to be reduced corresponding to the distance from the wiring to the other points.

Here, the process of generating the emphasis pattern image 23 from the circuit pattern image 22 is illustrated. A number display of the circuit pattern image 22 is indicated by a symbol M30. Points over the wiring are indicated by "1", and the other points are indicated by "0".

In addition, as illustrated in the number display of a symbol M31, the emphasis pattern image generation unit 11 sets a value that corresponds to the thickness "2" and the total length "6", for example, to be "3", to the points over the wiring. Further, as illustrated in the number display of a symbol M3n, the emphasis pattern image generation unit 11 sets a value that attenuates corresponding to the distance. An image display for the number display of the symbol M3n is the emphasis pattern image 23.

As illustrated in FIG. 16, in a case where the target element is a device, the emphasis pattern image generation unit 11 emphasizes the circuit pattern image 22 based on the resistance value of the device and the distance from the device. In other words, the emphasis pattern image generation unit 11 assigns a value determined based on the resistance value of the device to points over the device, and assigns a value to be reduced corresponding to the distance from the device to the other points.

Here, the process of generating the emphasis pattern image 23 from the circuit pattern image 22 is illustrated. A number display of the circuit pattern image 22 is indicated by a symbol M40. The points over the resistance coupled to the wiring of the thickness "2" are indicated by "R", the other points over the wiring are indicated by "1", and the other points are indicated by "0".

In addition, as illustrated in the number display of a symbol M41, the emphasis pattern image generation unit 11 sets a value that corresponds to the resistance value, for example, to be "6", to the points over the resistance, and sets a value that corresponds to the thickness "2" and the total length "6", for example, to be "3", to the other points over the wiring. Further, as illustrated in the number display of a symbol M4n, the emphasis pattern image generation unit 11 sets a value that attenuates corresponding to the distance. An image display for the number display of the symbol M4n is the emphasis pattern image 23.

Flowchart of Emphasis Pattern Image Generation Processing

Figure 17:
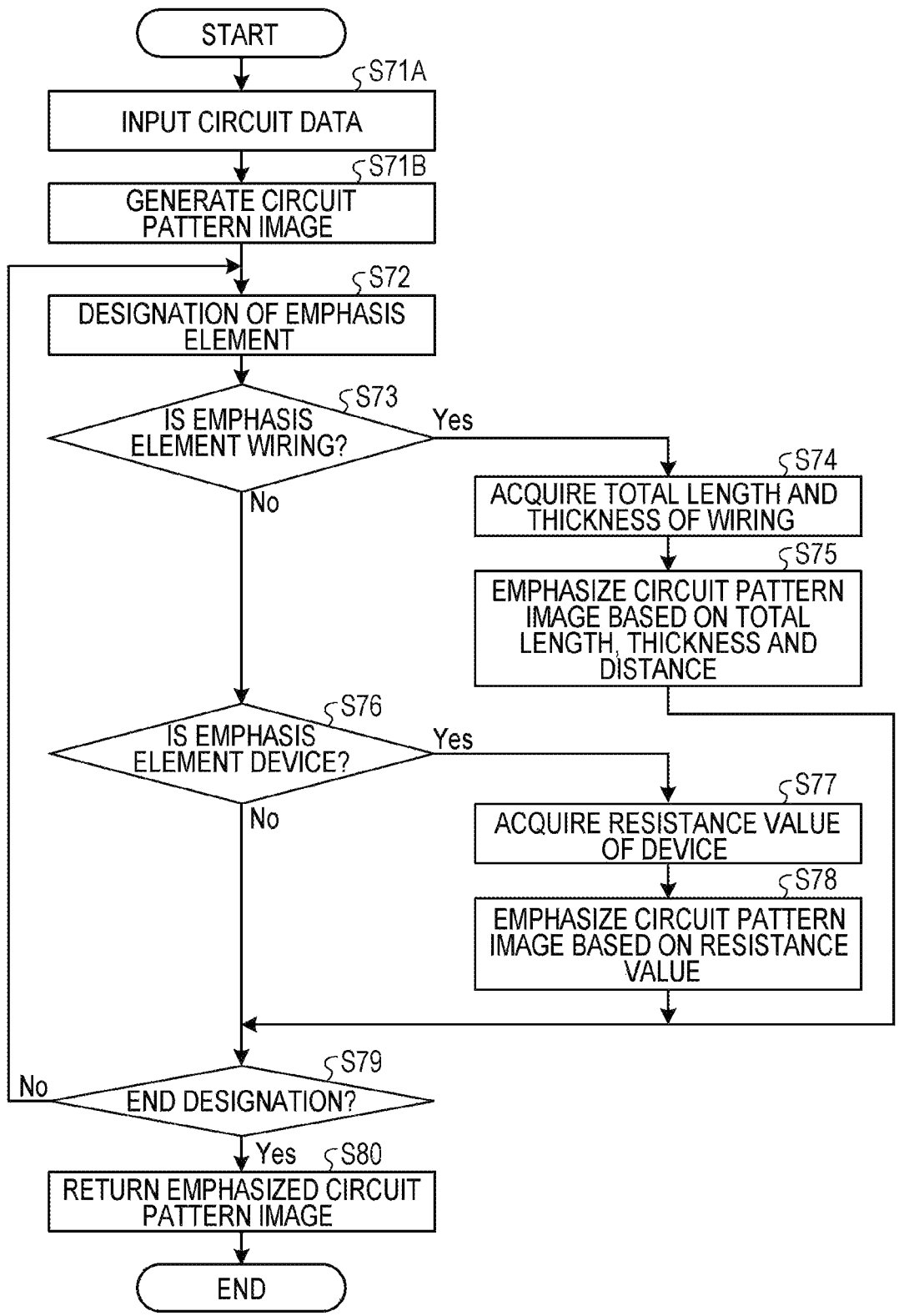
FIG. 17 is a view illustrating an example of a flowchart of the emphasis pattern image generation processing according to Example 2.

FIG. 17 is a view illustrating an example of a flowchart of the emphasis pattern image generation processing according to Example 2.

As illustrated in FIG. 17, the emphasis pattern image generation unit 11 inputs the circuit data 21 (step S71A). The emphasis pattern image generation unit 11 develops the circuit data 21 to generate the circuit pattern image 22 (step S71B).

The emphasis pattern image generation unit 11 inputs the designation of the emphasis element (step S72). In addition, the emphasis pattern image generation unit 11 determines whether the emphasis element is a wiring (step S73).

In a case where it is determined that the emphasis element is a wiring (step S73; Yes), the emphasis pattern image generation unit 11 acquires the total length and the thickness of the wiring from, for example, the circuit data 21 (step S74). In addition, the emphasis pattern image generation unit 11 emphasizes the circuit pattern image 22 based on the total length and the thickness of the wiring and the distance from the wiring (step S75). This is because of the characteristics that, as the total length of the wiring increases, and as the thickness of the wiring increases, the intensity over the wiring increases, the distance from the wiring increases, and accordingly, the intensity attenuates. In addition, the emphasis pattern image generation unit 11 proceeds to step S79.

Meanwhile, in a case where it is determined that the emphasis element is not a wiring (step S73; No), the emphasis pattern image generation unit 11 determines whether the emphasis element is a device (step S76).

In a case where it is determined that the emphasis element is a device (step S76; Yes), the emphasis pattern image generation unit 11 acquires the resistance value of the device from, for example, the circuit data 21 (step S77). In addition, the emphasis pattern image generation unit 11 emphasizes the circuit pattern image 22 based on the resistance value (step S78). This is because of the characteristics that, as the resistance value of the device increases, the intensity in the device increases. In addition, the emphasis pattern image generation unit 11 proceeds to step S79.

Meanwhile, in a case where it is determined that the emphasis element is not a device (step S76; No), the emphasis pattern image generation unit 11 proceeds to step S79.

In step S79, the emphasis pattern image generation unit 11 determines whether the designation of the emphasis element is finished (step S79). In a case where it is determined that the designation of the emphasis element is not finished (step S79; No), the emphasis pattern image generation unit 11 proceeds to step S72 to designate the next emphasis element.

Meanwhile, in a case where it is determined that the designation of the emphasis element is finished (step S79; Yes), the emphasis pattern image generation unit 11 calls the emphasis pattern image 23 obtained by emphasizing the circuit pattern image 22 and return the emphasis pattern image 23 (step S80). In addition, the emphasis pattern image generation unit 11 ends the emphasis pattern image generation processing.

Effect of Example 2

According to the above-described Example 2, the estimation device 1 generates the emphasis pattern image 23 obtained by emphasizing each target element of the circuit pattern image 22 of the target circuit by the emphasizing method that corresponds to the type of each target element, with respect to the target element which is at least a part of elements included in the target circuit. The estimation device 1 estimates the far field of the heat radiated from the target circuit by an existing learning model using the emphasis pattern image 23. According to an aspect, in the estimation device 1, in a case of estimating the far field of the heat radiated from the circuit using the machine learning, it is possible to improve the estimation accuracy. In other words, in the estimation device 1, it is possible to estimate the far field of the heat with excellent accuracy by estimating the far field of the heat using the emphasis pattern image 23 obtained by the emphasizing method that corresponds to the type of the target element. In addition, in the estimation device 1, it is possible to estimate the far field of the heat at high speed by using the emphasis pattern image 23 obtained by emphasizing the target circuit for the input into the learning model, instead of the simulation result.

In addition, the learning model is a model learned using the emphasis pattern image 23 obtained by emphasizing each target element of the circuit pattern image 22 of the circuit by the emphasizing method and a far field of correct solution (simulation result data 24), as learning data. According to the configuration, in the estimation device 1, it is possible to estimate the far field of the heat with excellent accuracy with respect to the target circuit by using the learning model in which the influence (near field) of the heat is taken into consideration.

In addition, in the estimation device 1, in a case where a far field indicating the simulation result for a first circuit approximates a far field indicating the simulation result for a second circuit in which the target element included in the first circuit is varied, the circuit pattern image 22 of the second circuit is added as the learning data. According to the configuration, in the estimation device 1, it is possible to easily increase the number of pieces of different learning data. In addition, in the estimation device 1, it is possible to make the heat radiation estimation results the same when the simulation results are the same circuit even when the circuit positions are different.

Others

The respective components of the illustrated estimation device 1 do not necessarily have to be physically configured as illustrated. In other words, specific aspects of the separation and integration of the estimation device 1 are not limited to the illustrated aspects, and all or a part thereof may be separated and integrated in any units in either a functional or physical manner depending on various loads, usage states, and the like. For example, the data generation unit 14 and the data expansion unit 15 may be integrated as one unit. In addition, the emphasis pattern image generation unit 11 may be separated into a first generation unit that generates the emphasis pattern image 23 that corresponds to the circuit data 21 for teacher data, and a second generation unit that generates the emphasis pattern image 23 that corresponds to the target circuit data 21. Further, the storage unit 20 may be coupled via a network as an external device of the estimation device 1.

Figure 18:
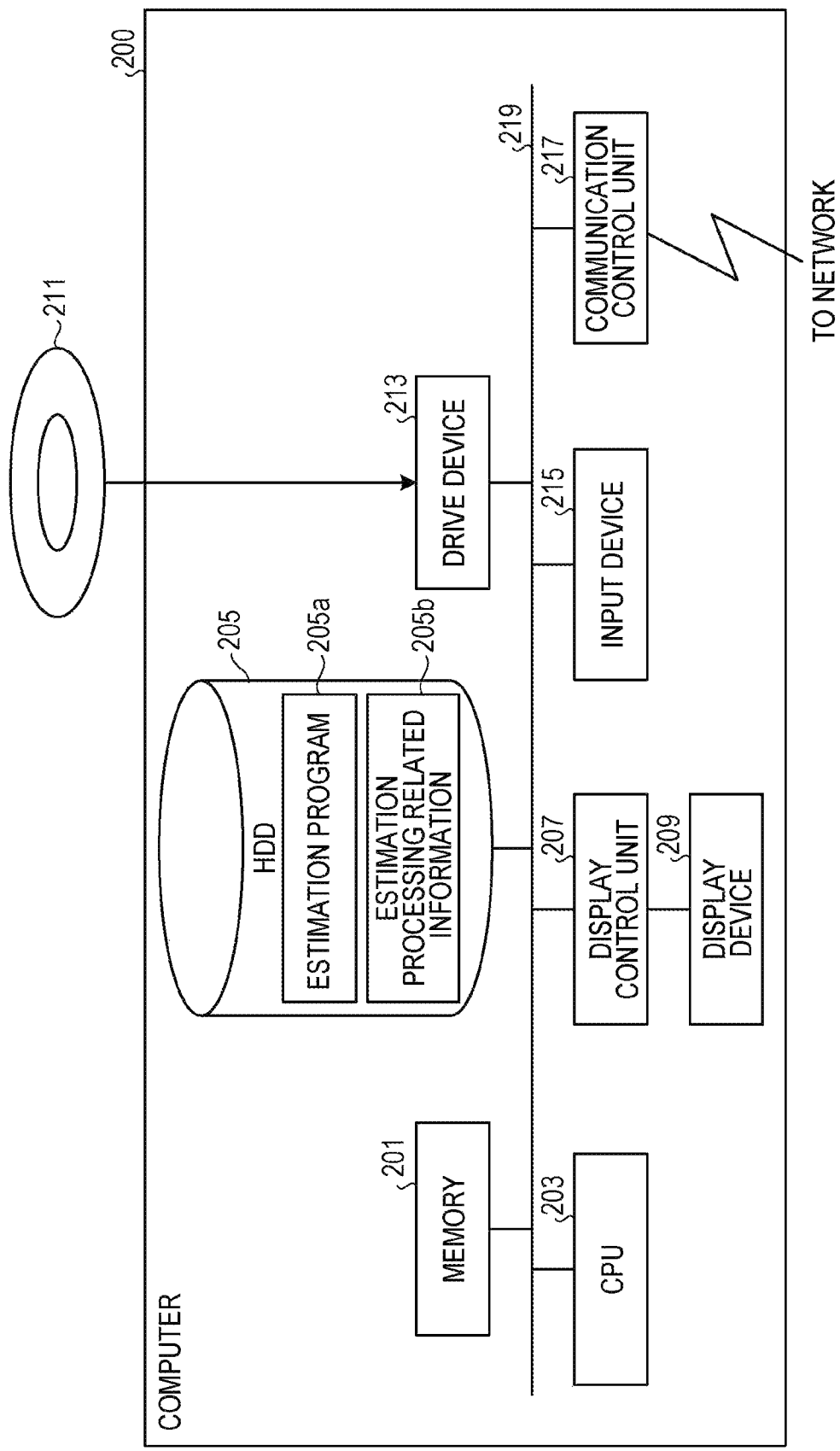
FIG. 18 is a view illustrating an example of a computer that executes an estimation program.

The various kinds of processing described in the above-described examples may be achieved by a computer, such as a personal computer or a work station, executing a computer program prepared in advance. Hereinafter, an example of a computer that executes the estimation program implementing functions that are the same as those of the estimation device 1 illustrated in FIG. 1 will be described. FIG. 18 is a view illustrating an example of the computer that executes the estimation program.

As illustrated in FIG. 18, a computer 200 includes a CPU 203 that executes various arithmetic processing, an input device 215 that receives the input of the data from the user, and a display control unit 207 that controls a display device 209. In addition, the computer 200 further includes a drive device 213 that reads a program or the like from a storage medium, and a communication control unit 217 that exchanges data with another computer via the network. Further, the computer 200 also includes a memory 201 for temporarily storing various information, and a hard disk drive (HDD) 205. In addition, the memory 201, the CPU 203, the HDD 205, the display control unit 207, the drive device 213, the input device 215, and the communication control unit 217 are coupled to each other via a bus 219.

The drive device 213 is, for example, a device for a removable disk 210. The HDD 205 stores an estimation program 205a and estimation processing related information 205b.

The CPU 203 reads the estimation program 205a, develops the estimation program 205a in the memory 201, and executes the estimation program 205a as a process. Such a process corresponds to each functional unit of the estimation device 1. The estimation processing related information 205b includes the circuit data 21, the circuit pattern image 22, the emphasis pattern image 23, the simulation result data 24, and the far field data 25. In addition, for example, the removable disk 210 stores various information of the estimation program 205a or the like.

Further, the estimation program 205a may not necessarily have to be stored in the HDD 205 from the beginning. For example, the program may be stored in a "portable physical medium" to be inserted into the computer 200, such as a flexible disk (FD), a compact disk read only memory (CD-ROM), a digital versatile disk (DVD), a magnetooptical disk, or an integrated circuit (IC) card. In addition, the computer 200 may execute the estimation program 205a by reading the estimation program 205a from the portable physical medium.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention,

What is claimed is:

1. A non-transitory computer-readable storage medium storing an estimation program for causing a computer to execute a process comprising:
generating an emphasis second pattern image which emphasizes a pattern of a target element, among target elements, from a first pattern image of a target circuit, according to an emphasizing method corresponding to a type of the target element; and
inputting the emphasis second pattern image, as the first pattern image of the target circuit, to an estimation learning model to obtain an estimated far field of electromagnetic waves or heat radiation for the target circuit,
wherein the emphasizing method to generate the emphasis second pattern image includes
assigning a value determined based on a length of the target element in the first pattern image of the target circuit to points over the target element, and
assigning a reduced value to a point other than the points over the target element in the first pattern image of the target circuit, the reduced value being reduced from a value corresponding to a distance from the target element in the first pattern image of the target circuit.

2. The non-transitory computer-readable storage medium according to claim 1,
wherein the target element is an element that has an influence on radiation of the electromagnetic waves or the heat of the target circuit.

3. The non-transitory computer-readable storage medium according to claim 2,
wherein the target element is an element included in the target circuit which is designated.

4. The non-transitory computer-readable storage medium according to claim 3,
wherein the target element is an element that is included in the target circuit and satisfies a predetermined reference.

5. The non-transitory computer-readable storage medium according to claim 4,
wherein, in a case where the target element is a wiring and the far field of the electromagnetic waves of the target circuit is estimated, the emphasizing method further performs emphasizing based on a length of the wiring and a distance from the wiring.

6. The non-transitory computer-readable storage medium according to claim 4,
wherein, in a case where the target element is a device and the far field of the electromagnetic waves of the target circuit is estimated, the emphasizing method further performs an emphasizing based on a mismatching amount of characteristic impedances between the device and a wiring coupled to the device.

7. The non-transitory computer-readable storage medium according to claim 4,
wherein, in a case where the target element is a wiring and the far field of the heat of the target circuit is estimated, the emphasizing is further performed based on a thickness of the wiring.

8. The non-transitory computer-readable storage medium according to claim 4,
wherein, in a case where the target element is a device and the far field of the heat of the target circuit is estimated, the emphasizing is further performed based on a resistance value of the device and a distance from the device.

9. The non-transitory computer-readable storage medium according to claim 1,
wherein the estimation model is a model learned using the emphasis second pattern image obtained by emphasizing the target element, among the target elements, from the first pattern image of the circuit by the emphasizing method and a far field of electromagnetic waves or heat radiation of correct solution, as learning data.

10. The non-transitory computer-readable storage medium according to claim 9,
wherein, in a case where a far field of electromagnetic waves or heat radiation indicating a simulation result for a first circuit approximates a far field of electromagnetic waves or heat radiation indicating a simulation result for a second circuit in which the target element included in the first circuit is varied, a pattern image of the second circuit usable as the first pattern image of a target circuit is added as the learning data.

11. An estimation apparatus comprising:

a memory, and a processor coupled to the memory and configured to:

generate an emphasis second pattern image which emphasizes a pattern of a target element, among target elements, from a first pattern image of a target circuit, according to an emphasizing method corresponding to a type of the target element; and input the emphasis second pattern image, as the first pattern image of the target circuit, to an estimation learning model to obtain an estimated a far field of electromagnetic waves or heat radiated for the target circuit, wherein the emphasizing method to generate the emphasis second pattern image includes assigning a value determined based on a length of the target element in the first pattern image of the target circuit to points over the target element, and assigning a reduced value to a point other than the points over the target element in the first pattern image of the target circuit, the reduced value being reduced from a value corresponding to a distance from the target element in the first pattern image of the target circuit.

12. An estimation method performed by a computer, the method comprising:

generating an emphasis second pattern image which emphasizes a pattern of a target element, among target elements, from a first pattern image of a target circuit, according to an emphasizing method corresponding to a type of the target element; and inputting the emphasis second pattern image, as the first pattern image of the target circuit, to an estimation learning model to obtain an estimated far field of electromagnetic waves or heat radiation for the target circuit, wherein the emphasizing method to generate the emphasis second pattern image includes assigning a value determined based on a length of the target element in the first pattern image of the target circuit to points over the target element, and assigning a reduced value to a point other than the points over the target element in the first pattern image of the target circuit, the reduced value being reduced from a value corresponding to a distance from the target element in the first pattern image of the target circuit.

* * * * *